(12) United States Patent
Kawabata et al.

(10) Patent No.: US 7,252,903 B2
(45) Date of Patent: Aug. 7, 2007

(54) BATTERY PACK

(75) Inventors: Katsuhiko Kawabata, Sumoto (JP); Atsushi Watanabe, Tsuna-gun (JP); Masatsugu Naka, Sumoto (JP); Hiromu Kubota, Mihara-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 631 days.

(21) Appl. No.: 10/695,869

(22) Filed: Oct. 30, 2003

(65) Prior Publication Data
    US 2004/0091769 A1    May 13, 2004

(30) Foreign Application Priority Data
    Oct. 31, 2002  (JP) .............................. 2002-318062
    Dec. 27, 2002  (JP) .............................. 2002-379386

(51) Int. Cl.
    *H01M 2/12* (2006.01)
(52) U.S. Cl. ......................................... 429/53; 429/82
(58) Field of Classification Search ................ 429/136, 429/180, 53, 97, 98, 99, 100, 56; H01M 2/12, H01M 2/10
    See application file for complete search history.

(56) References Cited

U.S. PATENT DOCUMENTS 4,115,629 A * 9/1978 Dey et al. .................... 429/56
5,354,133 A * 10/1994 Rapparini ................... 383/103

FOREIGN PATENT DOCUMENTS

JP    2000-315483    11/2000

* cited by examiner

*Primary Examiner*—Susy Tsang-Foster
*Assistant Examiner*—Ben Lewis
(74) *Attorney, Agent, or Firm*—Wenderoth, Lind & Ponack, L.L.P.

(57) ABSTRACT

The battery 2 of the battery pack is temporarily held in a mold 30 to form a molded resin region 1, synthetic resin injected into the mold cavity 31 to form the molded resin region 1 attaches to the battery 2, and the molded resin region 1 attaches to a safety valve opening surface 20 established at the battery safety valve opening region 9. Further, insulating material 15 is attached at the interface between the battery safety valve opening surface 20 and the molded resin region 1 in a position which closes off the safety valve opening region 9.

20 Claims, 21 Drawing Sheets

BATTERY PACK

This application is based on Applications No. 318062 filed in Japan on Oct. 31, 2002 and No. 379386 filed in Japan on Dec. 27, 2002, the contents of which are incorporated hereinto by reference.

BACKGROUND OF THE INVENTION

1. Field of the Invention

This invention relates to a battery pack in which a battery pack core is insertion molded into a molded resin region. Specifically, this invention relates to a battery pack manufactured by temporarily holding the battery in a mold which forms the molded resin region, and by attaching the molded resin region to the battery by a process step which forms the molded resin region.

2. Description of the Related Art

Present battery packs are assembled by inserting a battery pack core, which is a battery and essential parts connected as a unit, into an external case formed of plastic. Since a battery pack of this configuration is assembled by attaching the battery pack core in a fixed position within the external case, its manufacture requires considerable effort. Accordingly, a battery pack which does not use an external case has been developed. This battery pack is manufactured by insertion of the battery pack core during formation of a molded resin region, which corresponds to the external case. In this configuration of battery pack, the battery pack core is fabricated by connecting essential components, such as connecting terminals, to the battery. The battery pack core is temporarily held in the mold cavity which forms the molded resin region. When molten synthetic resin is injected into the mold cavity, the injected resin adheres to the battery. Since the battery can be fixed relative to the molded resin region during molding, a battery pack manufactured in this way can efficiently be produced in quantity by omitting the external case. The molded resin region serves to anchor the battery, connecting terminals, and other components as a single unit as well as to form part of an external case for the battery pack. Consequently, since the battery pack core can form a solid unit when the molded resin region is formed, this battery pack configuration has the characteristic that it can be manufactured efficiently and inexpensively in quantity. This type of battery pack is cited, for example, in Japanese non-examined patent publication no. 315483/2000. As shown in FIG. 1, during formation of the molded resin region, which becomes the external case of the battery pack, the battery pack core 90 is inserted in the mold. Specifically, this battery pack is made by temporarily holding the battery pack core 90, which connects the battery 92, the circuit board 91, and other components comprising the battery pack, in the cavity 94 of the mold 93, injecting molten plastic into the mold cavity 94 to embed part of the inserted battery pack core 90 in the molded resin region, and finally by removing the unit from the mold after plastic solidification. In this battery pack, the battery pack core and molded resin region are attached as a single structure with no gaps allowing efficient manufacture in quantity.

In a battery pack manufactured with the structure described above, the molded resin region can be attached in a manner which closes off a battery safety valve opening, and the safety valve can thereby be protected by the molded resin region. When internal battery pressure exceeds a set pressure, the safety valve opens to exhaust gas, etc. to the exterior and prevent internal pressure from becoming abnormally high. A battery pack with a safety valve protected by molded resin region can prevent a user from inadvertently poking and damaging the safety valve opening with a needle-like object. However, during the manufacturing process for this type of battery pack when molten synthetic resin is injected to form the molded resin region which locally covers the safety valve opening, the pressure of the injected synthetic resin can damage the safety valve. To prevent this deleterious effect, the safety valve opening is covered with insulating material while the molded resin region is formed. The insulating material prevents resin injected into the mold cavity from entering the safety valve, and is used to prevent damage to the safety valve during molding.

However, it is difficult to reliably attach the molded resin region and insulating material in this type of battery pack. Since the molded resin region attaches to the battery with insulating material disposed between the two, the battery pack has the drawback that attachment strength between the battery and molded resin region is degraded. When attachment strength between the battery and molded resin region is degraded, the molded resin region can de-laminate from the battery during use rendering the battery pack unusable.

In addition, even though insulating material is attached to the safety valve opening, safety valve damage cannot reliably be prevented by insulating material which is easily deformed. This is because, as shown in FIG. 2, molten synthetic resin injected into the mold cavity for molded resin region formation can deform the insulating material 95 and damage the safety valve 96.

The present invention was developed with the objective of solving the problems described above. Thus it is a primary object of the present invention to provide a battery pack which reliably attaches the molded resin region and insulating material while preventing damage to the safety valve during molded resin region formation, and which does not result in molded resin region de-lamination.

The above and further objects and features of the invention will more fully be apparent from the following detailed description with accompanying drawings.

SUMMARY OF THE INVENTION

In the battery pack of the present invention, the battery is temporarily held in the mold which forms the molded resin region, synthetic resin is injected into the molded resin region mold cavity and is attached to the battery, and the molded resin region is attached to a safety valve opening surface provided on the safety valve opening region of the battery. Further, insulating material is attached at the interface of the battery safety valve opening surface and the molded resin region in a position which closes off the safety valve opening region. This insulating material has a through hole located at a position away from the safety valve opening region. Resin is injected into the through hole, and the molded resin region is attached to the safety valve opening surface via the through hole.

The insulating material can be a rigid plate material which will not deform under the pressure of molded resin region formation. Glass fiber reinforced epoxy plate can be used as the rigid plate material. The insulating material can be attached to the battery safety valve opening surface via double sided adhesive tape. In addition, the outline of the insulating material can be made smaller than the outer perimeter of the battery safety valve opening surface, and the molded resin region can attach to the safety valve opening surface at the perimeter of the insulating material to further strengthen attachment of the molded resin region to the battery. The insulating material can attach to the safety valve opening surface with a protruding electrode terminal of the battery. The insulating material through hole can be established between the protruding electrode terminal and the safety valve opening region.

The battery pack has a formed plastic piece made separately from the molded resin region, which attaches to the opposite end of the battery from the safety valve opening region and attached molded resin region. The surface of this formed plastic piece can be made in a symmetric shape. The formed plastic piece can be provided with alignment ribs, which locally contact the attachment surface at the end of the battery and align the formed plastic piece allowing it to be attached to the battery in proper orientation.

An embedded projection on the insulating material can be a reverse tapered projection which becomes thicker or wider towards its end, a projection with hooks provided at its end, a rod with a plurality of projections provided on its surface, or a rod provided with cavities or through holes in its surface. The battery pack described above has the characteristic that the molded resin region and insulating material can be firmly joined and the molded resin region can be attached to the battery via the insulating material in a manner that will not de-laminate, while reliably preventing damage to the safety valve during molding. This is because the insulating material, disposed at the interface between the molded resin region and the battery safety valve opening surface, is provided with a through hole or embedded projection. For insulating material with a through hole, resin of the molded resin region is injected into the through hole, and that part of the molded resin region attaches to the battery safety valve opening surface. Synthetic resin which is injected into the insulating material through hole forms as a single piece with the molded resin region and is attached to the battery safety valve opening surface. This synthetic resin firmly attaches the insulating material to the safety valve opening surface and prevents its misalignment during molding. Properly aligned insulating material does not deform and protects the safety valve opening region. A safety valve protected by insulating material is not damaged by synthetic resin which forms the molded resin region. For insulating material with an embedded projection, the embedded projection becomes buried in the molded resin region and firmly joins the insulating material with the molded resin region via the embedded projection. By firmly joining the insulating material and the molded resin region, the embedded projection in the molded resin region reliably protects the safety valve opening region with the insulating material. A safety valve protected in this manner is not damaged by the synthetic resin which forms the molded resin region.

Further, in the solidly formed state, the embedded projection in the molded resin region is formed as a single unit with the molded resin region. Therefore, the insulating material can be solidly joined with the molded resin region and solidly joined with the battery via the molded resin region.

The embedded projection buried in the molded resin region has an anchoring effect connecting the insulating material to the molded resin region. However, the insulating material can be still more strongly connected with the molded resin region by forming the embedded projection to hook or latch into the molded resin region.

Still further, the battery pack has conducting material disposed in opposition to, and separated from the battery safety valve opening surface, and this conducting material electrically connects to the battery directly or indirectly via electronic devices. Insulating material is disposed between this conducting material and the safety valve opening surface, and the conducting material can be electrically insulated from the battery safety valve opening surface via the insulating material. This conducting material is either a conducting region on the surface of a printed circuit board, or a battery terminal lead, or both.

The insulating material has a through hole established in a location separated from a position opposite the safety valve opening region. Resin for the molded resin region is injected into this through hole, and the insulating material can be attached to the battery safety valve opening surface by the molded resin region formed in the through hole. The insulating material is attached to the safety valve opening surface at the battery protruding electrode terminal, and the through hole can be established between the protruding electrode terminal and safety valve opening region.

DETAILED DESCRIPTION OF THE INVENTION

Figure 1:
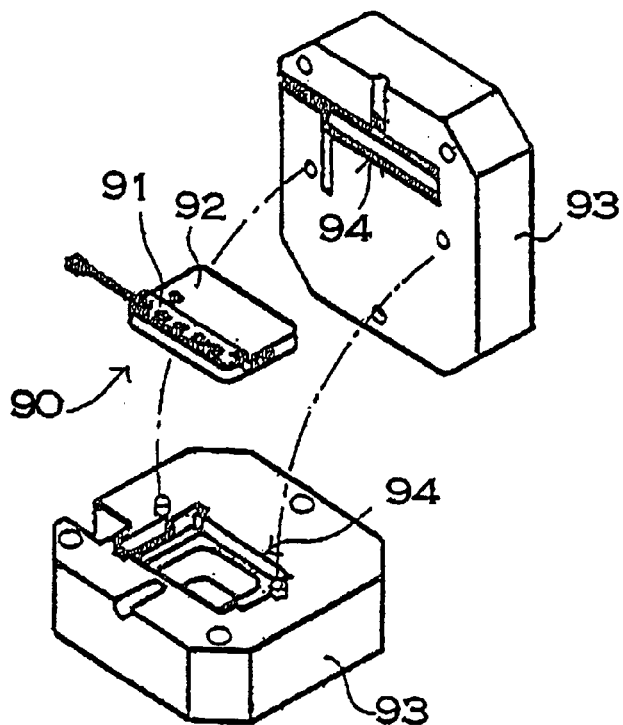
FIG. 1 is a perspective view showing the manufacturing method of a related art battery pack.
Figure 2:
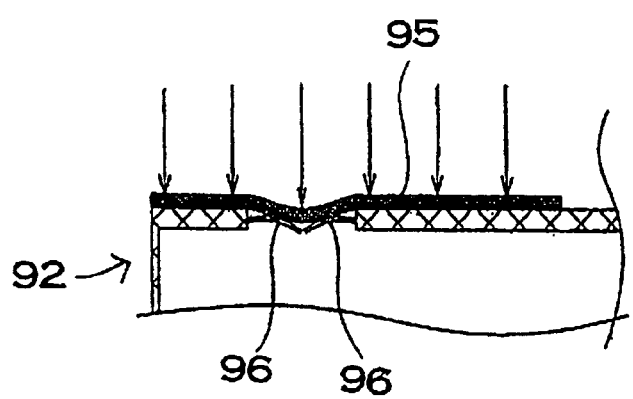
FIG. 2 is a cross-sectional view showing a related art battery pack safety valve being damaged during a process to form a molded resin region.
Figure 3:
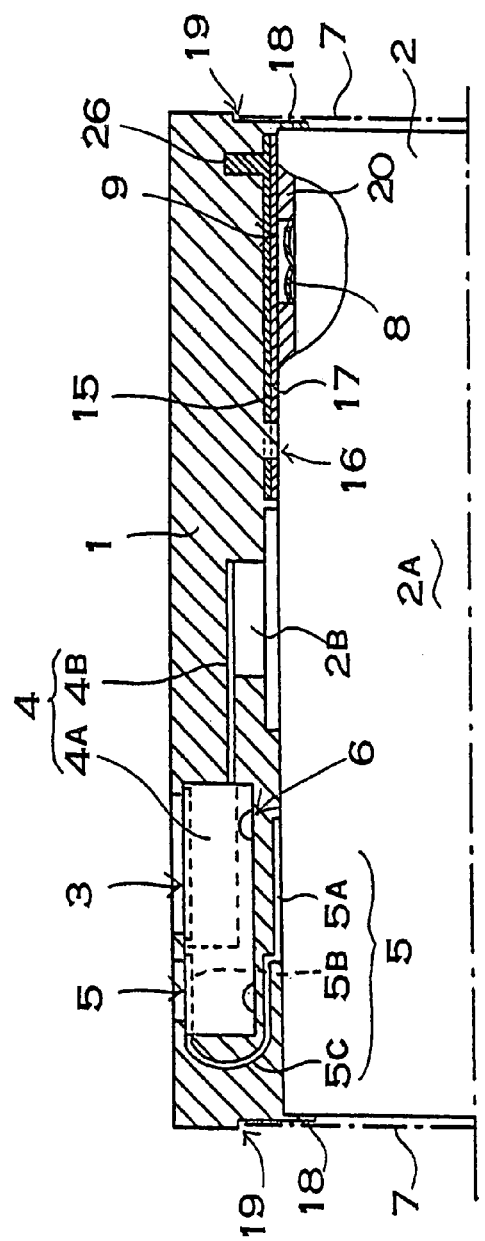
FIG. 3 is a horizontal cross-sectional view of the battery pack molded resin region of an embodiment of the present invention.

The battery pack of FIG. 3 has a safety valve 8, a safety valve opening surface 20 provided on the safety valve opening region 9, and this safety valve opening surface 20 is attached to a molded resin region 1. In the battery pack of FIG. 3, the molded resin region 1 is formed with a protection device 4 inserted during molding. Although not illustrated, components, such as a circuit board with protection circuitry mounted or with output terminals attached, can also be inserted during molding. Since the battery pack of FIG. 3 has the safety valve opening region 9 provided at the battery end plane with a protruding electrode terminal 2B, the molded resin region 1 is attached to that end plane. However, the safety valve opening region 9 may also be established at the battery end plane opposite the protruding electrode terminal, and the molded resin region can be attached to that end plane. Although not illustrated, a thin outline battery may have safety valves established on both of its thin side walls, and a molded resin region can also be attached to these safety valve opening surfaces.

Figure 4:
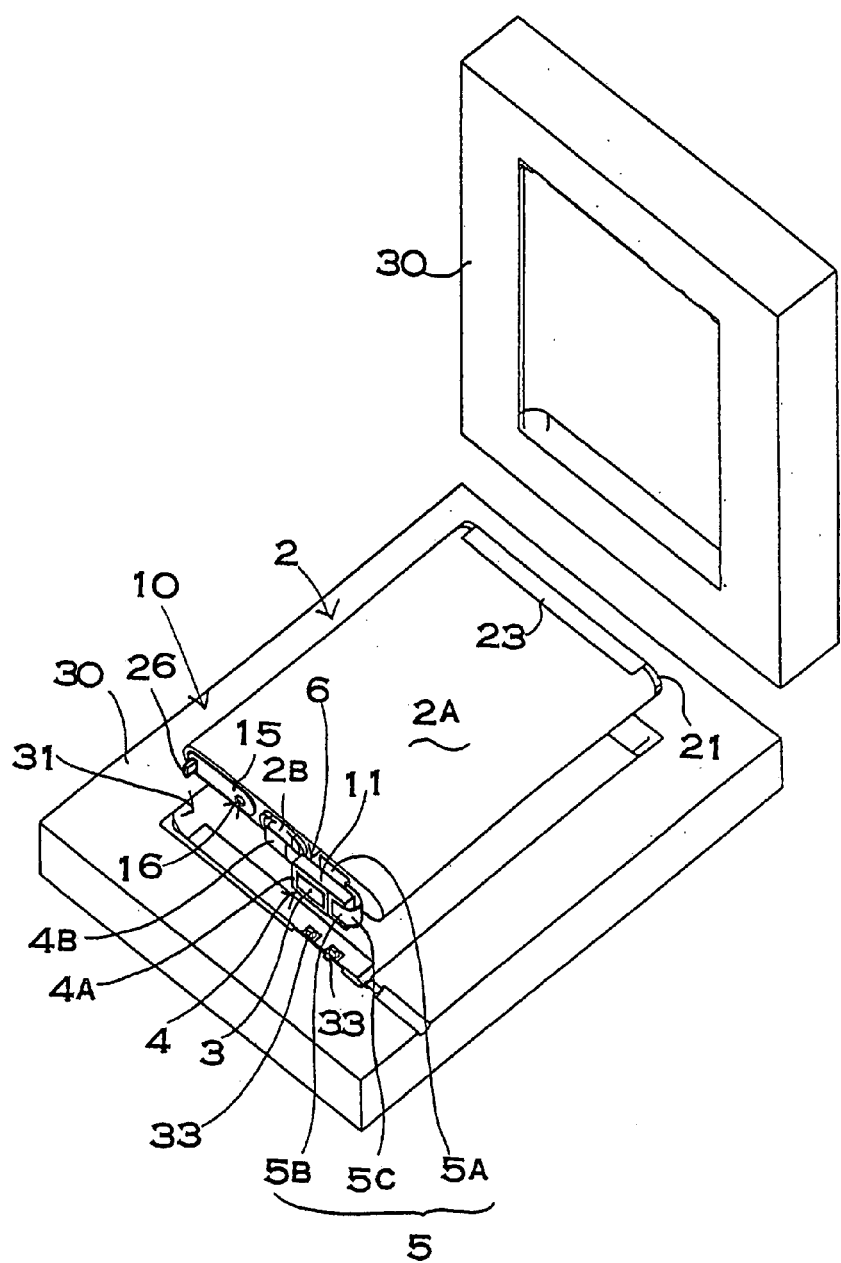
FIG. 4 is a perspective view showing the battery pack core of the battery pack shown in FIG. 3 placed in a mold.
Figure 5:
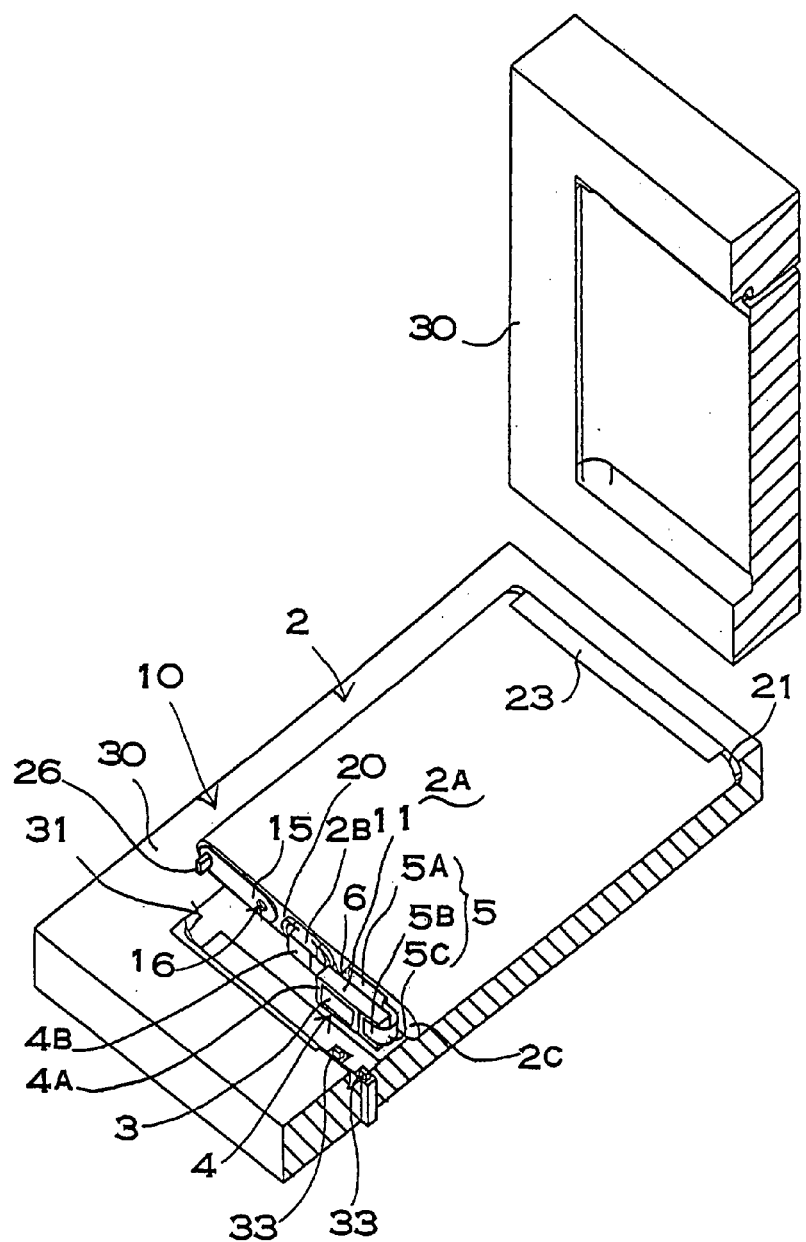
FIG. 5 is a perspective cross-sectional view of the mold shown in FIG. 4.

As shown in the perspective views of FIGS. 4 and 5, the battery pack core 10 is temporarily held in the mold 30, molten resin is injected into the mold cavity 31, and the battery pack is fabricated with part of the battery pack core 10, retaining the protection device 4 in a fixed position, inserted within the molded resin region 1. The battery pack core 10 is a unit with the protection device 4 connected to the battery 2. The battery pack core 10 with protection device 4 attached is a very simple structure which can be inexpensively produced. However, although not illustrated, the battery pack of the present invention may also be configured with other components such as a printed circuit board in addition to the protection device inserted within the molded resin region.

As shown in FIGS. 5-8, the battery pack core 10 has insulating material 15 disposed on the safety valve opening surface 20. This insulating material 15 include a through hole 16 and is positioned so as to close off the safety valve opening region 9. Further, as shown in the cross-sectional views of FIGS. 3 and 8, after formation of the molded resin region 1, the insulating material 15 is disposed at the interface between the safety valve opening surface 20 and the molded resin region 1. The insulating material 15 is a rigid plate material which will not deform under the pressure of synthetic resin injected into the mold cavity 31 during formation of the molded resin region 1. For example, the insulating material 15 can be a rigid synthetic resin plate such as glass fiber reinforced epoxy plate or phenol plate. However, the present invention does not limit the insulating material to rigid synthetic resin, and rigid plate materials with an insulating surface or insulating throughout, such as metal plate covered with an insulating surface layer, or an inorganic material formed as a plate, can be used as the insulating material.

Figure 8:
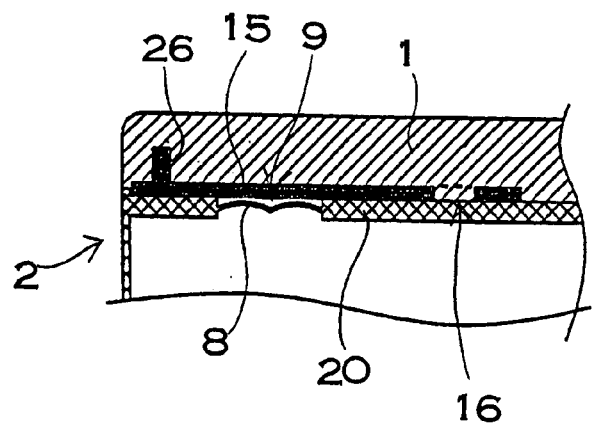
FIG. 8 is a cross-sectional view of the safety valve area of the molded resin region.
Figure 9:
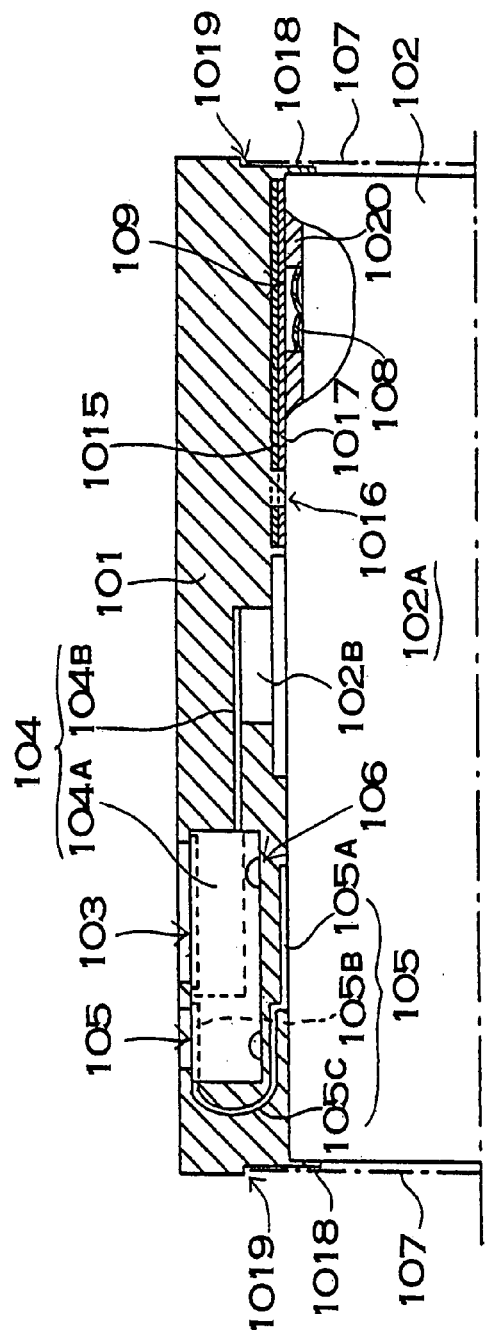
FIG. 9 is a horizontal cross-sectional view of the battery pack molded resin region of another embodiment of the present invention.
Figure 10:
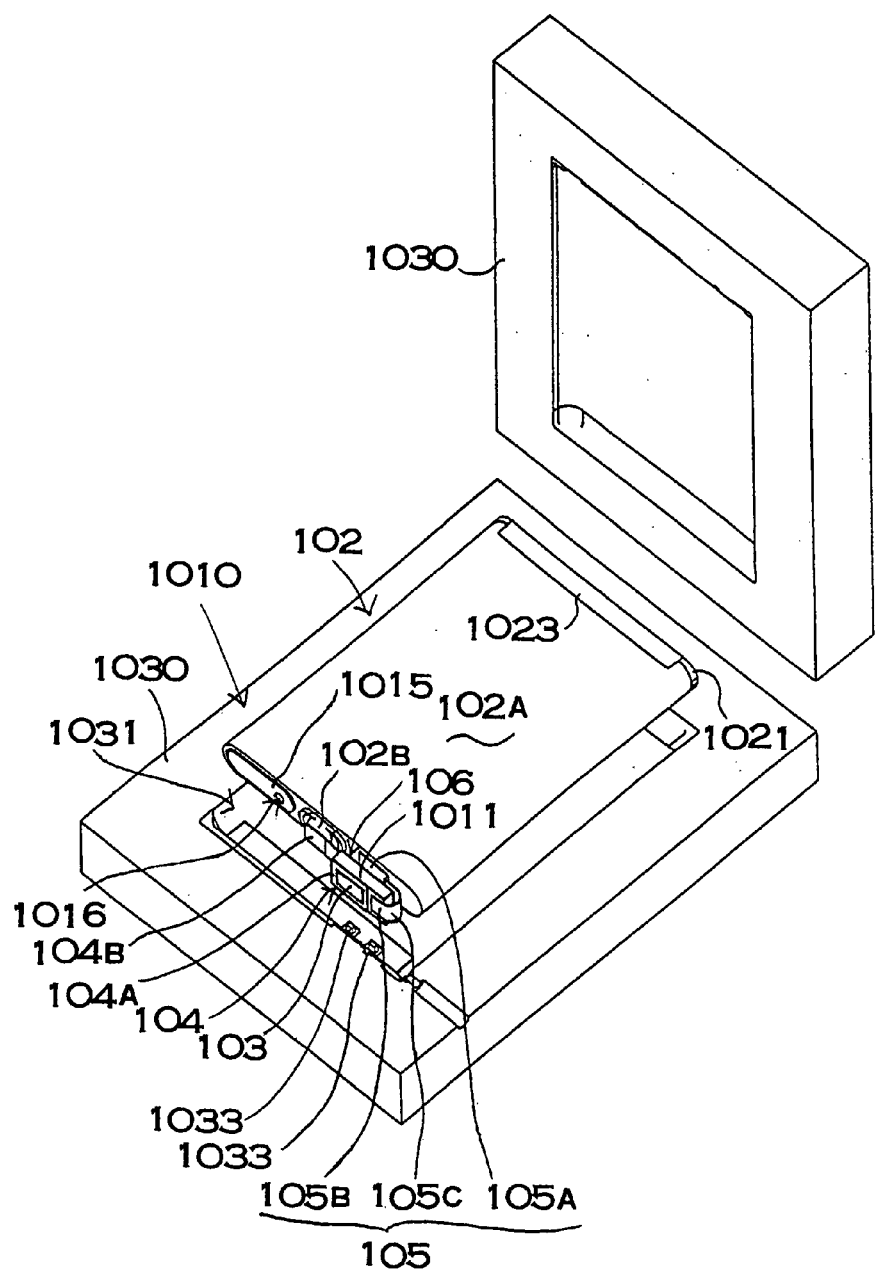
FIG. 10 is a perspective view showing the battery pack core of the battery pack shown in FIG. 9 placed in a mold.
Figure 11:
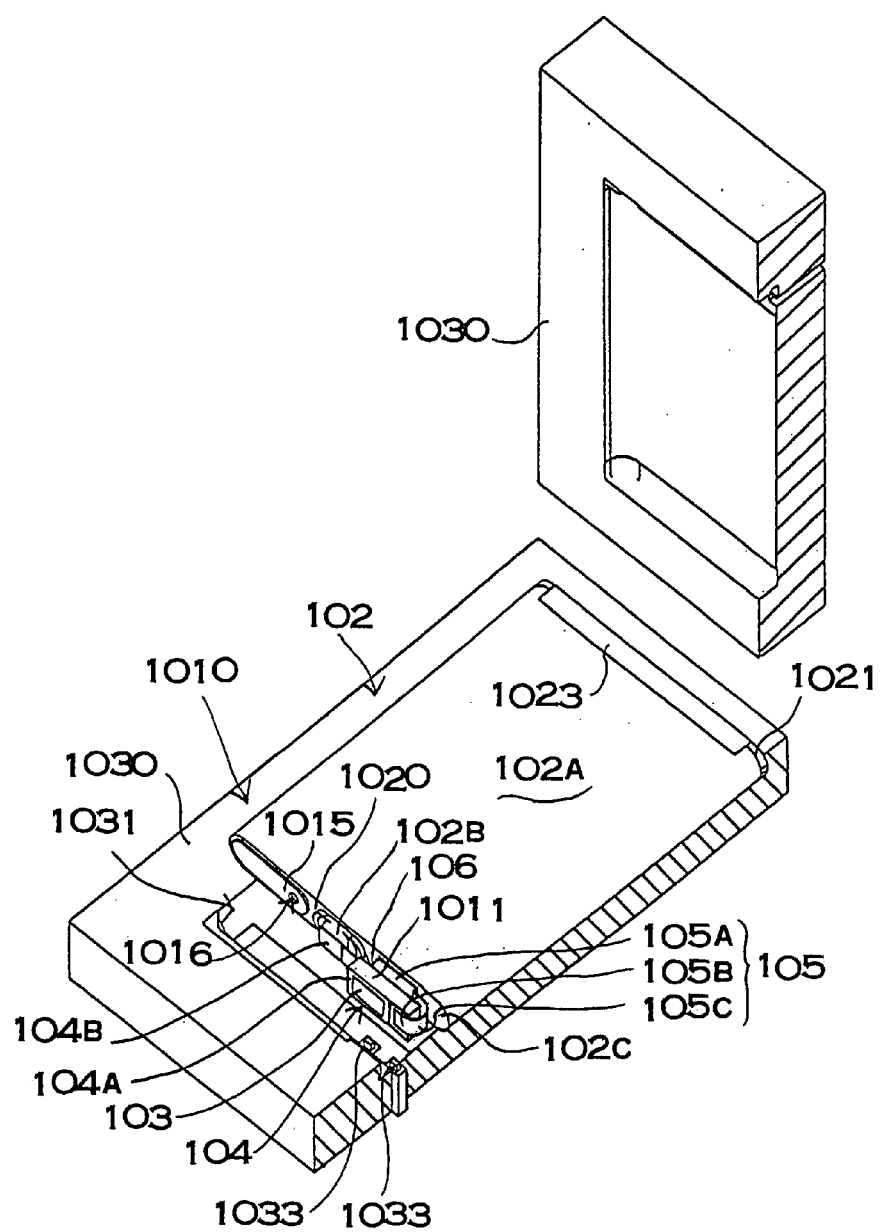
FIG. 11 is a perspective cross-sectional view of the mold shown in FIG. 10.
Figure 12:
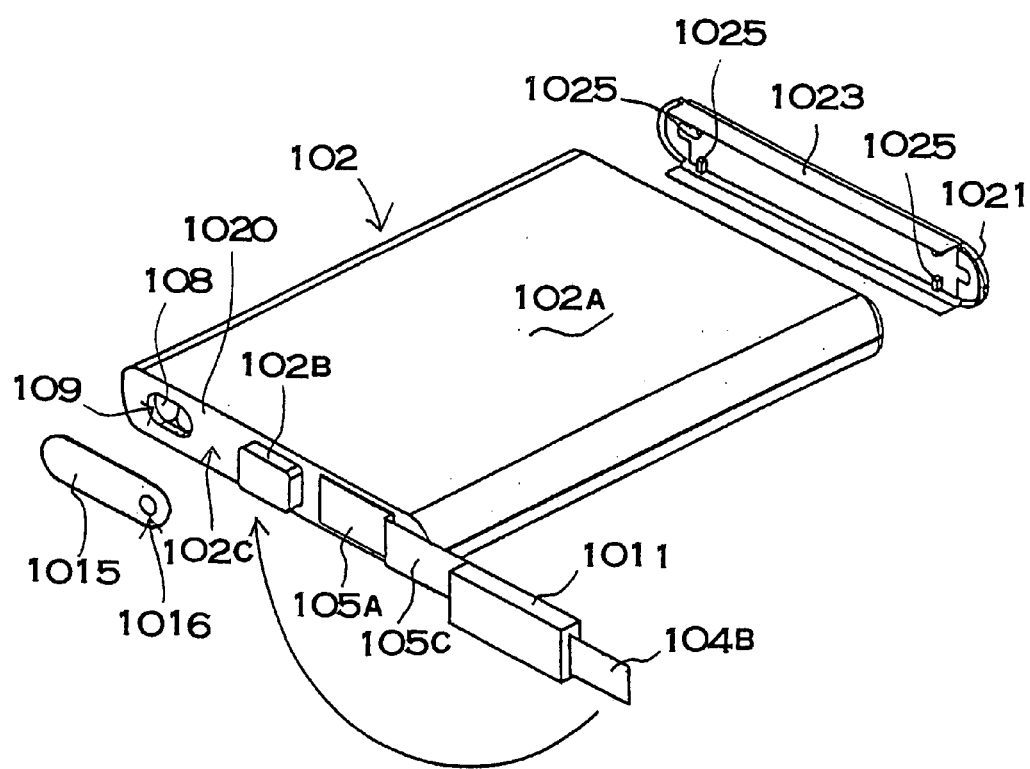
FIG. 12 is an exploded perspective view of the battery pack core shown in FIG. 10.
Figure 13:
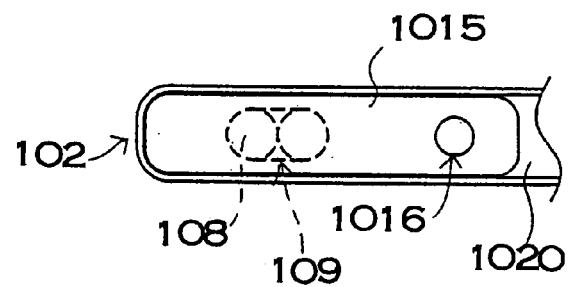
FIG. 13 is a plan view showing insulating material disposed on the safety valve opening surface of the battery pack core.
Figure 14:
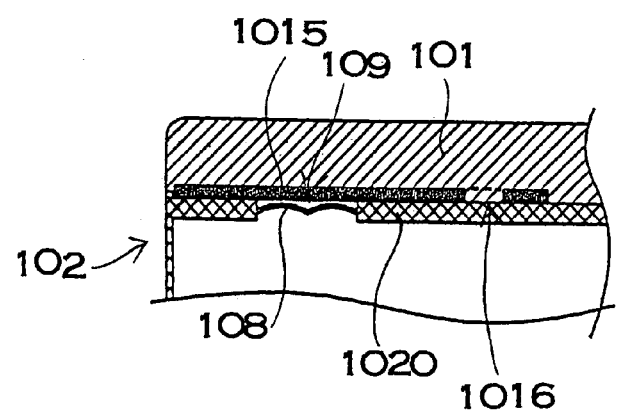
FIG. 14 is a cross-sectional view of the safety valve area of the molded resin region.

The insulating material 1015 of the battery pack shown in FIGS. 9-14 has a through hole 1016 established at a location separated from a position opposite the safety valve opening region 109. The insulating material 1015 of FIGS. 12 and 13 has a through hole 1016 opened through its right side in the figures. Resin of the molded resin region 101 is injected into this through hole 1016. As shown in FIGS. 9 and 14, molded resin region 101 injected inside the through hole 1016 passes through the insulating material 1015 to attach to the battery safety valve opening surface 1020. The insulating material 1015 of the figures has its through hole 1016 established between the safety valve 108 opening region 109 and the protruding electrode terminal 102B. However, the through hole can also be established on the opposite side of the safety valve opening region rather than between the opening region and the protruding electrode terminal. Further, as shown in FIG. 13, the outline of the insulating material 1015 is made smaller than the perimeter of the battery 102 safety valve opening surface 1020, and the molded resin region 101 is attached to the safety valve opening surface 1020 at the periphery of the insulating material 1015. As shown in these figures, insulating material 1015, which has a through hole 1016 established at one end and has an outline smaller than the safety valve opening surface 1020, allows firm attachment of the molded resin region 101 to the safety valve opening surface 1020 via the periphery and through hole 1016. Here, structural elements of an embodiment, which are the same in FIGS. 9-14 as in FIGS. 3-8, have the same part numbers except in the highest order two digits and their descriptions are abbreviated.

Figure 6:
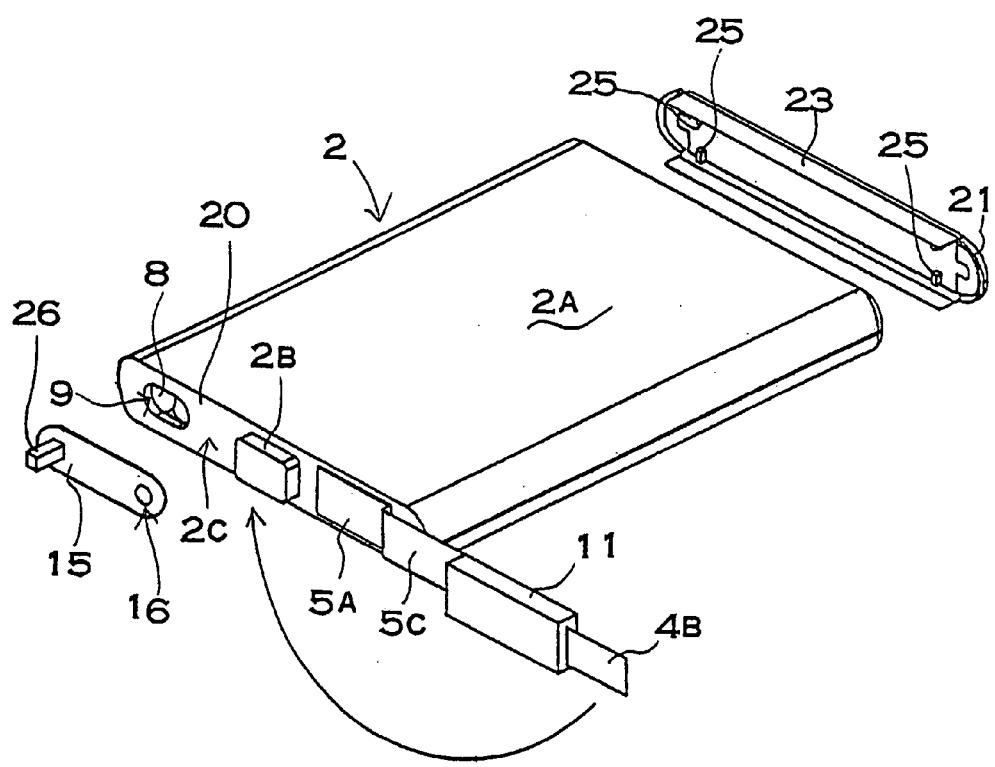
FIG. 6 is an exploded perspective view of the battery pack core shown in FIG. 4.
Figure 7:
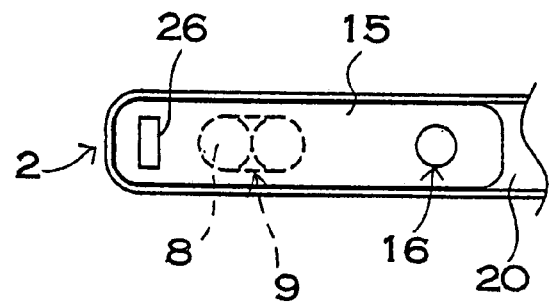
FIG. 7 is a plan view showing insulating material disposed on the safety valve opening surface of the battery pack core.

The insulating material 15 of the battery pack shown in FIGS. 3-8 is provided with an embedded projection 26 on its surface, which faces opposite the battery 2. In FIGS. 3 and 8, the bottom surface of the insulating material 15 is attached to the battery 2 safety valve opening surface 20 and the embedded projection 26 is provided on the upper surface. This embedded projection 26 becomes buried in the molded resin region 1, and the insulating material 15 and the molded resin region 1 are joined more solidly via the embedded projection 26. Plastic insulating material 15 can be formed as a single piece with the embedded projection 26. However, the insulating material 15 can be formed separately from the embedded projection 26 and the embedded projection can be fixed to the upper surface of the plate-shaped body of insulating material by bonding or welding. The embedded projection 26 can also be attached to the insulating material body via double sided tape. Further, although not illustrated, a projection can be provided on the embedded projection, a corresponding insertion slot or insertion hole can be provided in the insulating material body, and the projection can be inserted in, and joined to the insulating material body. In addition to inserting the projection into an insertion slot or hole, the mated unit can also be bonded or welded to firmly fix the embedded projection to the insulating material body.

Figure 15:
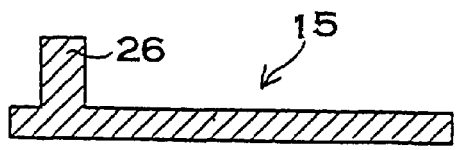
FIG. 15 is a cross-sectional view showing an embodiment of an embedded projection provided on the insulating material.
Figure 16:
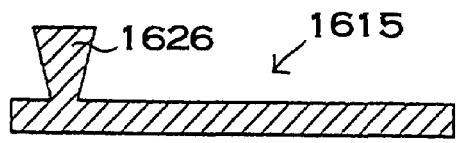
FIG. 16 is a cross-sectional view showing another embodiment of an embedded projection provided on the insulating material.
Figure 17:
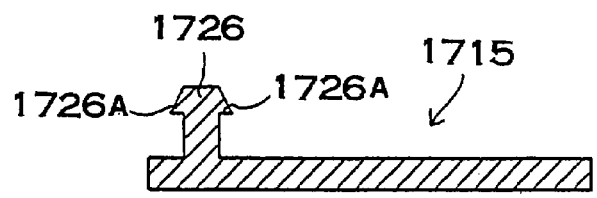
FIG. 17 is a cross-sectional view showing another embodiment of an embedded projection provided on the insulating material.
Figure 18:
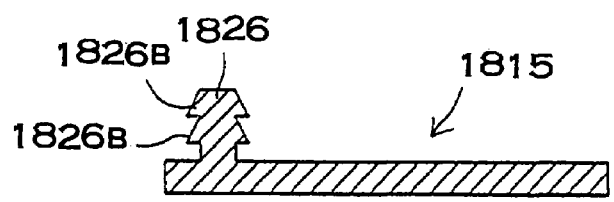
FIG. 18 is a cross-sectional view showing another embodiment of an embedded projection provided on the insulating material.
Figure 19:
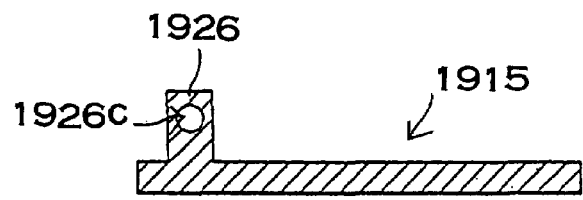
FIG. 19 is a cross-sectional view showing another embodiment of an embedded projection provided on the insulating material.

The embedded projection 26 is formed in shapes shown in FIGS. 15-19. The embedded projection 26 of FIG. 15 is formed in a pole or cylindrical shape. This embedded projection 26 can be a cylindrical shape such as a square cylinder, a polygonal cylinder, a circular cylinder, or an elliptical cylinder. The embedded projection 1626 of FIG. 16 has a reverse taper and its shape becomes thicker or wider towards its end. The embedded projection 1726 of FIG. 17 has hooks 1726A established at its end. The embedded projection 1826 of FIG. 18 has a rod shape with a plurality of projections 1826B from its surface. The embedded projection 1926 of FIG. 19 has a rod shape with a hole 1926C through it. Although not illustrated, the embedded projection can also have a rod shape with depressions or cavities in its surface. As shown in FIGS. 15-19, an embedded projection shaped to anchor inside the molded resin region has the characteristic that the insulating material can be attached to the molded resin region in an extremely strong fashion. In FIGS. 16-19, 1615, 1715, 1815, and 1915 indicate the insulating material.

The embedded projection 26 of the insulating material 15 shown in the previous figures is positioned at an end region of the long narrow safety valve opening surface 20, and is provided at the left end in the figures. As shown in FIGS. 6-8, the embedded projection 26 is positioned on the opposite side of the safety valve 8 opening region 9 from the protruding electrode terminal 2B. Namely, the embedded projection 26 is positioned and attached to the battery 2 between the safety valve 8 opening region 9 and the battery side wall. However, the embedded projection of the insulating material can also be disposed between the safety valve opening region and the protruding electrode terminal. Although the insulating material 15 shown in the previous figures is provided with one embedded projection 26, the surface of the insulating material may also be provided with a plurality of embedded projections. For example, embedded projections may be disposed on the insulating material at both sides of the safety valve opening region.

Further, a through hole 16 is established through the insulating material 15 of the figures at a location away from the safety valve opening region 9. In FIGS. 6-8, the through hole 16 is established on the right side of the insulating material 15 of the figures. Namely, in the insulating material 15 of the figures, the through hole 16 is provided on the opposite side from the embedded projection 26. Resin of the molded resin region 1 is injected into this through hole 16. As shown in FIGS. 3 and 8, molded resin region 1 embedded in the through hole 16 passes through the insulating material 15 to attach to the battery safety valve opening surface 20. In particular, in a structure with an embedded projection 26 on one side and a through hole 16 on the other side of the safety valve opening region 9, insulating material 15 is firmly joined with the molded resin region 1, and molded resin region 1 embedded within the through hole 16 attaches to the safety valve opening surface 20. Therefore, insulating material 15 can be firmly attached to the molded resin region 1 while attaching to the battery 2. The insulating material 15 of the figures has a through hole 16 established between the safety valve opening region 9 and the protruding electrode terminal 2B. However, the through hole can also be established on the opposite side of the safety valve opening region rather than between the opening region and the protruding electrode terminal. Further, the embedded projection and the through hole can also be provided adjacent to each other on the same side of the insulating material relative to the safety valve opening region.

Further, as shown in FIG. 7, the outline of the insulating material 15 is made smaller than the perimeter of the battery safety valve opening surface 20, and the molded resin region 1 is attached to the safety valve opening surface 20 at the periphery of the insulating material 15. As shown in this figure, insulating material 15, which has a through hole 16 established at one end and has an outline smaller than the safety valve opening surface 20, allows firm attachment of the molded resin region 1 to the safety valve opening surface 20 via the periphery and through hole 16.

The insulating material 15 is fixed to the planar region 2C of the battery safety valve opening surface 20 via double sided adhesive tape 17. Double sided tape 17, which attaches the insulating material 15 to the planar region 2C of the safety valve opening surface 20, preferably has sufficient thickness to absorb topology in the attachment region. This double sided tape 17 can adhere closely and reliably attach the insulating material 15 to the safety valve opening surface 20, while also serving to protect the safety valve 8. When the safety valve 8 opens, the insulating material 15 de-laminates and gas is discharged to the outside.

The protection device 4 safely protects the battery by cutting off current when battery conditions become abnormal. The protection device can be a circuit breaker, a PTC device, a fuse, or a protection circuit configured of electronic circuitry. A circuit breaker detects temperature and excessive current to cut off current. A PCT device detects temperature to effectively cut off current. A fuse detects excessive current to cut off current. A protection circuit of electronic circuitry detects excessive battery current and temperature or overcharge and over-discharge to control charge and discharge current.

Figure 20:
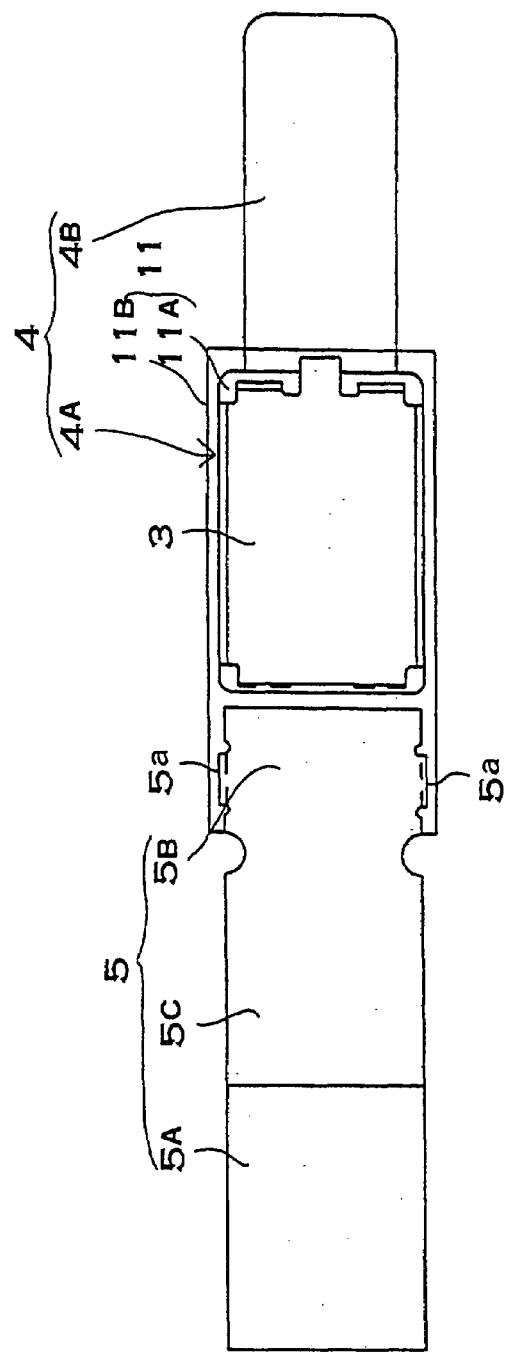
FIG. 20 is a plan view of the protection device.
Figure 21:
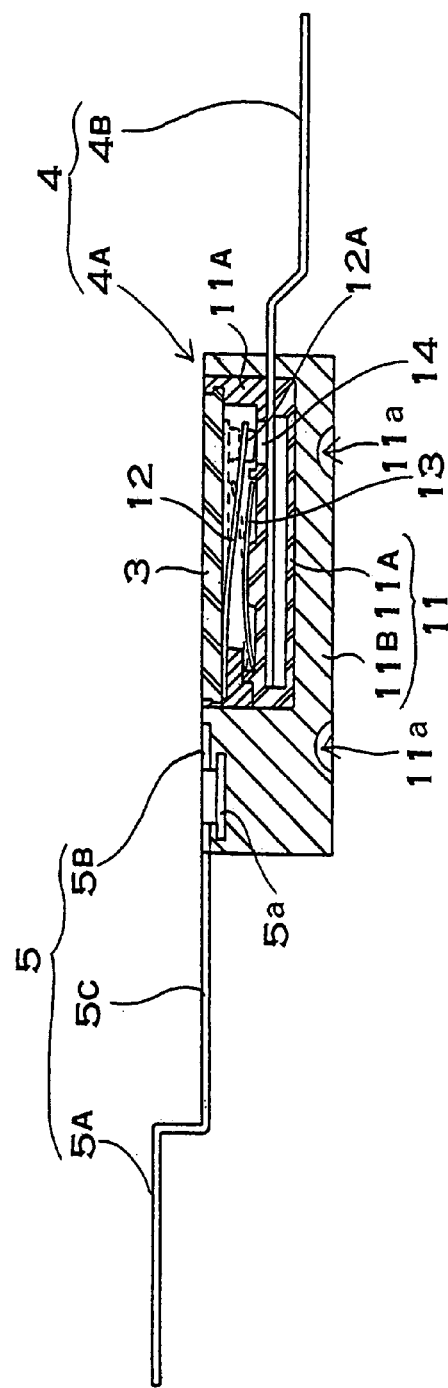
FIG. 21 is a cross-sectional view of the protection device shown in FIG. 20.

A protection device 4 such as these has a lead 4B projecting out from the casing 11A of the main body 4A of the device. A holder 11 for the protection device 4 is made in part or entirely of insulating material, and a first output terminal 3 and a second output terminal 5 are fixed to the surface of this insulating holder 11. The protection device 4 shown in FIGS. 20 and 21 has its main body 4A inserted and fixed in a formed back piece 11B, and the holder 11 is made up of the main body casing 11A and the formed back piece 11B. The first output terminal 3 is fixed to the main body casing 11A, which is part of the holder 11.

The second output terminal 5 is inserted and fixed in the surface of the formed back piece 11B, which is part of the holder 11. The second output terminal 5 shown in FIGS. 20 and 21 has hooks 5a on both sides to solidly insert and fix the output terminal 5 in the holder 11 in a manner that won't pull out. The hooks 5a project outward from both sides at the end of the output terminal 5, are embedded in the holder 11, and attach like an anchor without pulling out. The second output terminal 5 is connected to one battery 2 electrode and connects the protection device 4 with the battery 2.

Further, the protection device 4 of the figures has alignment cavities 11a provided in the holder 11 for temporarily holding the protection device 4 in the proper position within the mold cavity 31, which forms the molded resin region 1. The holder shown in the figures is provided with a plurality of alignment cavities 11a on both sides of its bottom. The alignment cavities 11a mate with movable pins 33 in the mold 30 to temporarily hold the protection device 4 in proper position for molding.

Except for the region which fastens the first output terminal 3, the main body casing 11A is formed from plastic, which is an insulator. During formation of the plastic casing 11A, the first output terminal 3, which is positioned to become the upper surface of the casing 11A, is inserted and fixed in the plastic casing 11A. The top and bottom of the first output terminal 3 pass through the main body casing 11A, which makes up part of the protection device holder 11. The top surface of the first output terminal 3 is exposed outside the battery pack molded resin region 1. The bottom or inside surface of the first output terminal 3 connects with protection components housed in the protection device main body casing 11A. Since the first output terminal 3 of the protection device 4 shown in the figures is exposed on both the inside and outside of the casing 11A, the casing is formed from insulating plastic except for the first output terminal 3 region. However, the protection device holder can also be formed entirely from insulating plastic and the first and second output terminals can be attached by a method such as bonding or insertion molding. Further, the holder can also be formed from an insulator such as plastic only in the region of the first and second output terminals, while making the rest of the holder of metal.

Since the protection device 4 is connected in series with the battery 2, a pair of terminals is required. In the protection device 4 of the figures, one terminal is the lead 4B projecting out from the casing 11A and the other terminal is the first output terminal 3. The first output terminal 3 is fixed to the upper surface of the main body casing 11A, and the lead 4B extends out from the main body 4A casing 11A. In the protection device 4 of the figures, the top side of the main body casing 11A has the first output terminal 3 attached and the back side has the lead 4B attached. The lead 4B is not attached precisely to the back side of the main body 4A casing 11A, but is attached near the back side. For purposes of this application, the back side of the main body 4A is used to include the meaning near the back side of the main body 4A. The lead 4B attached to the back side of the main body 4A extends parallel to the front and back of the protection device 4 and is attached to the surface of the battery protruding electrode terminal 2B. The lead 4B and the protruding electrode terminal 2B are welded together by a method such as spot welding or laser welding. In this orientation, the holder 11 of the protection device 4, which is connected to the battery 2, is disposed opposite the safety valve opening surface 20 planar region 2C with no protruding electrode terminal 2B. Consequently, a dimension adjustment gap 6 is established between the protection device 4 holder 11 and the safety valve opening surface 20 planar region 2C. The dimension adjustment gap 6 regulates gap size to accommodate deformation of the lead 4B during molded resin region 1 formation. The lead 4B, which is temporarily held in the mold cavity 31, is made of flexible metal plate, and this allows size regulation at the dimension adjustment gap 6. This configuration allows battery 2 dimension differences to be absorbed by the dimension adjustment gap 6.

The protection device 4 of the figures is a circuit breaker. The circuit breaker is provided with a movable contact 12 and a temperature sensitive metal 13 which switches the movable contact 12 on and off. The movable contact 12 is a conducting metal strip which is flexible and can deform. One end of the movable contact 12 is connected to the output terminal 3 and the other end is has contact metal 12 A attached. When the contact metal 12A at the end of the movable contact 12 touches a fixed contact 14 on the lead 4B, which is attached to the casing 11A, the breaker is ON, and when the movable contact 12 separates from the lead 4B, the breaker switches OFF. The temperature sensitive metal 13 is a laminate of a plurality of metals with different thermal coefficients of expansion such as a bimetal or trimetal. The temperature sensitive metal 13 deforms with temperature increase and moves the movable contact 12 from the ON position to the OFF position.

In the circuit breaker of these figures, the temperature sensitive metal 13 detects battery temperature and switches the movable contact 120N and OFF. Although not illustrated, the circuit breaker may also be configured to pass current through the temperature sensitive metal, or a temperature sensitive resistor may be connected in series with the battery and configured to heat the temperature sensitive metal. Namely, the breaker may also be configured to detect excessive current and cut off that current. The movable contact may also be made of temperature sensitive metal. In this case, circuit breaker internal structure can be simplified because the movable contact serves also as the temperature sensitive metal.

Although the protection device in the figures is a circuit breaker, the protection device can be a PTC device, a fuse, or a protection circuit configured of electronic circuitry. When the temperature of a PCT device rises above a set value, electrical resistance drastically increases to effectively cut off current. A PCT device connects between the first output terminal 3 and the lead 4B. A fuse melts open with excessive current and connects between the first output terminal 3 and the lead 4B. A protection circuit of electronic circuitry also connects between the first output terminal 3 and the lead 4B.

The second output terminal 5 is a metal strip made up of an output terminal region 5B, which is attached to the formed back piece 11B of the holder 11 and becomes a battery pack output terminal, a connecting region 5C, which connects to the output terminal region 5B, and an attachment region 5A, which attaches the connecting region 5C to the battery 2. This configuration of the second output terminal 5 is a metal strip cut to a prescribed shape which is attached to the protection device 4 by insertion molding in the formed back piece 11B of the holder 11. The second output terminal 5 is connected to the battery 2, which connects the holder 11 to the battery 2, by connecting the attachment region 5A to the battery 2 planar region 2C electrode using a method such as spot welding or laser welding.

When the protection device 4 is insertion molded into the molded resin region 1, the second output terminal 5 deforms in a manner similar to the lead 4B, and the second output terminal 5 has flexibility to change the position and orientation of the protection device 4 relative to the battery 2. This second output terminal 5 can absorb battery 2 dimension differences and allow proper disposition of the protection device 4 and second output terminal 5. When the second output terminal 5 is attached to a battery 2 with dimensions smaller than specified, distance between the attachment region 5A and the output terminal region 5B is increased. Conversely, when the second output terminal 5 is attached to a battery 2 with dimensions larger than specified, distance between the attachment region 5A and the output terminal region 5B is decreased to dispose the protection device 4 and second output terminal 5 in proper positions.

As shown in the figures, a flexible second output terminal 5 bends its connecting region 5C allowing the attachment region 5A and the output terminal region 5B to change position. However, part of the connecting region may be narrowed, or the connecting region may be provided with a bent region to also allow the attachment region 5A and the output terminal region 5B to change position.

When the battery pack core described above is temporarily held in the mold cavity 31, the protection device lead 4B and the second output terminal 5 deform to properly adjust the positions of the first output terminal 3 and the output terminal region 5B relative to the battery 2. The amount of lead 4B and second output terminal 5 deformation allows the first output terminal 3 and output terminal region 5B to be disposed in proper position while adjusting for battery 2 dimension differences. Significant battery 2 length dimension error can occur during processing. Battery 2 length dimension error can be absorbed by the dimension adjustment gap 6 between the protection device 4 and the safety valve opening surface 20. In a battery pack housing a battery longer than the specified length, the protection device main body 4A is in close proximity to the safety valve opening surface 20 planar region 2C and the dimension adjustment gap 6 is small. In a battery pack housing a battery shorter than the specified length, the dimension adjustment gap 6 is larger. In this manner, battery pack external dimensions are made to specification and the first and second output terminals 2, 5 are disposed in their proper positions.

For a battery pack core 10 configured as described above, the first output terminal 3 and the second output terminal 5 on the protection device 4 are pressed against a mold reference plane by movable pins to retain them in fixed positions as described below.

FIGS. 22-26 show molds 2230, 2330, 2430, 2530 which have movable pins 2233, 2333, 2433, 2533 which press the protection device 224, 234, 244, 254 against the mold 2230, 2330, 2430, 2530 reference plane 2232, 2332, 2432, 2532. In these molds 2230, 2330, 2430, 2530, movable pins 2233, 2333, 2433, 2533 extend into the mold cavities 2231, 2331, 2431, 2531 to press the first output terminal and second output terminal region on the protection device 224, 234, 244, 254 against the mold cavity reference plane 2232, 2332, 2432, 2532. The movable pins 2233, 2333, 2433, 2533 are guided into alignment cavities 2211a, 2311a, 2411a, 2511a, which are depressions provided in the protection device holder 2211, 2311, 2411, 2511, to temporarily hold the protection device 224, 234, 244, 254 in proper position. With the protection device 224, 234, 244, 254 retained in position within the mold cavity 2231, 2331, 2431, 2531 by the movable pins 2233, 2333, 2433, 2533, molten resin begins filling the mold cavity 2231, 2331, 2431, 2531 to form the molded resin region. Here, structural elements of an embodiment, which are the same in FIGS. 22-26 as previously described, have the same part numbers except in the highest order two digits and their descriptions are abbreviated.

Figure 22:
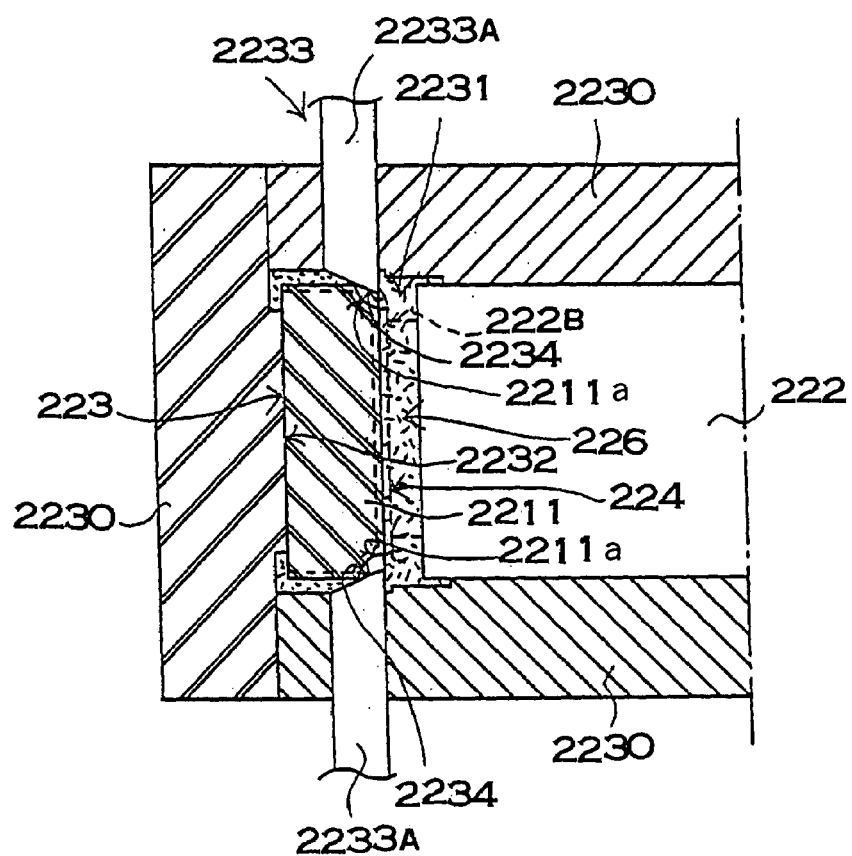
FIG. 22 is a cross-sectional view showing an embodiment of a mold for forming the molded resin region.

The movable pins 2233 in the mold 2230 shown in FIG. 22 are translation pins 2233A, which resiliently extend in a direction parallel to both sides of the protection device 224 holder 2211. These translation pins 2233A are guided into the alignment cavities 2211a in the holder 2211. The ends of the translation pins 2233A have inclined surfaces 2234 and the protection device holder 2211 is pressed into the mold 2230 reference plane 2232 via these inclined surfaces 2234. The inclined surfaces 2234 are inclined in a direction which can press the front surface of the protection device 224 into the mold 2230 reference plane 2232 when the translation pins 2233A are moved in their axial direction towards the protection device 224 holder 2211. The first output terminal 223 attached to the protection device main body and the second output terminal region are pressed into the mold reference plane 2232 and temporarily held in fixed positions. To press the front surface into the reference plane 2232, the inclined surfaces 2234 of the translation pins 2233A press against the back surface of the protection device holder 2211. Specifically, the inclined surfaces 2234 press against the corners between the back and side surfaces of the protection device holder 2211. The protection device holder 2211, which is pressed upon by the inclined surfaces 2234, is pressed against the reference plane 2232 by a force component which is perpendicular to the front surface of the holder 2211. Namely, when the translation pins 2233A extend into the mold cavity 2231, the inclined surfaces 2234 slide against alignment cavity 2211a corners provided on the protection device 224 holder 2211 to press the first output terminal 223 and the second output terminal region against the mold 2230 reference plane 2232. Translation pin 2233A inclined surfaces 2234 have a length which allows the thickest holder 2211, shown by solid lines in the figure, to the thinnest holder 2211, shown by broken lines in the figure, to be pressed against the reference plane 2232. The translation pins 2233A press resiliently against both sides of the protection device 224 holder 2211 to press the first output terminal 223 and the second output terminal region against the reference plane 2232. Preferably a plurality of translation pins 2233A are provided to press from above and below against a plurality of locations on both sides of the protection device 224 holder 2211. A holder 2211 pressed in this fashion in a plurality of locations by translation pins 2233A can be pressed more reliably against the reference plane 2232 and retained in a fixed position. The translation pins 2233A are connected to flexible material (not illustrated) outside the mold 2230 to allow the protection device holder 2211 to be pressed in a resilient fashion. In addition, the translation pins 2233A retract while the battery pack core is being set in the mold cavity 2231. This is to keep the translation pins 2233A from interfering with placement of the battery pack core. To allow translation pin 2233A retraction, translation pins 2233A are connected via flexible material to a retraction mechanism or cylinder (not illustrated) outside the mold 2230. Translation pins 2233A can be extended and retracted in a resilient fashion by using a cylinder which is an air cylinder (not illustrated).

Figure 23:
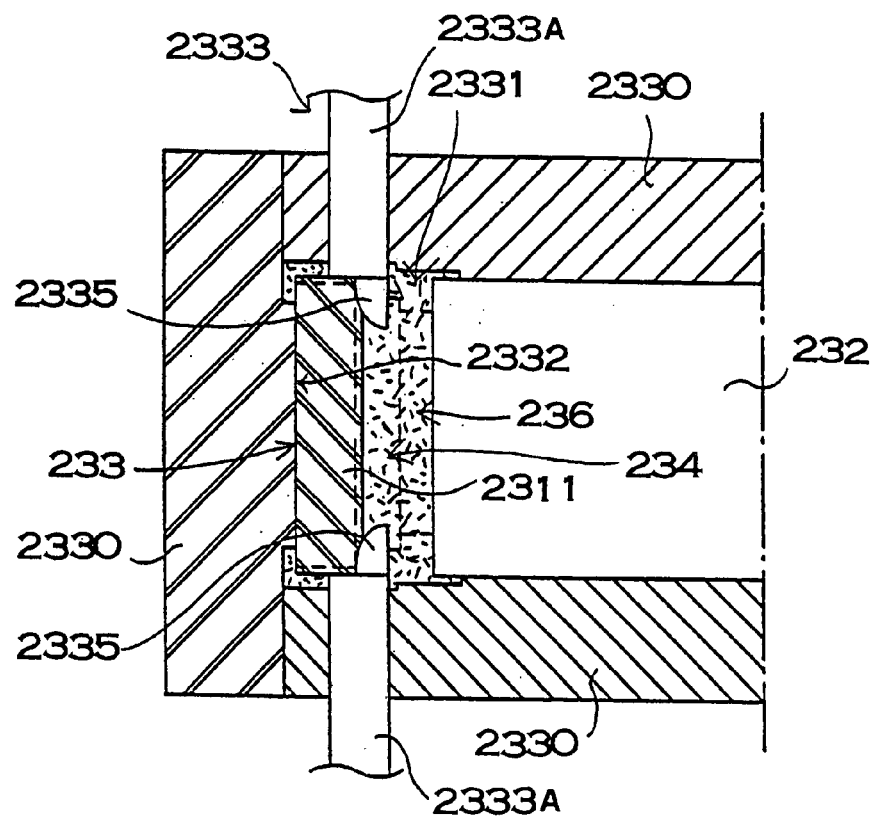
FIG. 23 is a cross-sectional view showing another embodiment of a mold for forming the molded resin region.

The movable pins 2333 of FIG. 23 are also translation pins 2333A, which extend into the mold cavity 2331 towards the protection device 234. These translation pins 2333A resiliently extend into the mold cavity 2331 parallel to the front surface of the protection device holder 2311 and press from the back surface of the protection device holder 2311 to hold the first output terminal 233 and the second output terminal region against the reference plane 2332. The tips of these translation pins 2333A are provided with projections 2335 extending in the direction of translation to press against the back surface of the protection device holder 2311. These projections 2335 press against the back surface of the protection device holder 2311 and retain the first output terminal 233 and the second output terminal region against the reference plane 2332. These translation pins 2333A extend parallel to, and along the back surface of the protection device holder 2311, and press against the back surface of the holder 2311 via the projections 2335. The projections 2335 press the back surface of a holder 2311, from the thickest holder 2311, shown by solid lines in the figure, to the thinnest holder 2311, shown by broken lines in the figure. Although the projections 2335 extend into the mold cavity 2331 in the same positions to press against a thick holder 2311 to a thin holder 2311, projections 2335 extend deeply into the mold cavity 2331 to press a thin holder 2311 against the reference plane 2332, and extend less to press a thick holder 2311 against the reference plane 2332. Namely, the projections 2335 extend and bite into the back surface of the protection device holder 2311, but the depth of that bite is different for a thick or thin holder 2311. Movable pins 2333 of this configuration have a simple structure, which allows projections 2335 to mate with the back surface of the protection device holder 2311 and firmly press, and retain the front surface first output terminal 233 and the second output terminal region in position against the reference plane 2332. Preferably a plurality of translation pins 2333A are provided to press from above and below against a plurality of locations on both sides of the protection device 234 holder 2311. A holder 2311 pressed in this fashion in a plurality of locations by translation pins 2333A can be pressed more reliably against the reference plane 2332 and retained in a fixed position. These translation pins 2333A also retract while the battery pack core is being set in the mold cavity 2331 in the same fashion as the translation pins 2233A with inclined surfaces 2334. This is to keep the translation pins 2333A from interfering with placement of the battery pack core.

Figure 24:
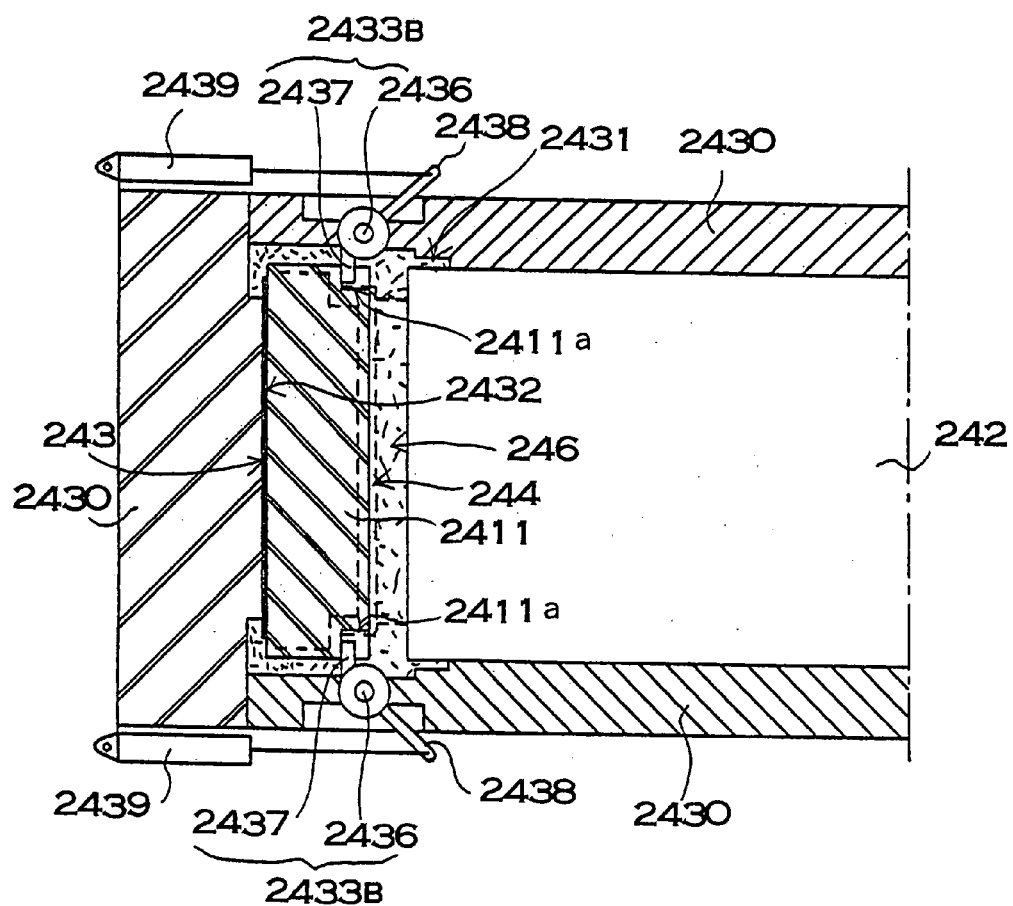
FIG. 24 is a cross-sectional view showing another embodiment of a mold for forming the molded resin region.

The movable pins 2433 of FIG. 24 are rotating pins 2433B, which extend into the mold cavity 2431 and rotate in a direction to press the back surface of the protection device holder 2411 towards the reference plane 2432. These rotating pins 2433B press against the back surface of the protection device 244 holder 2411 to press and retain the first output terminal 243 and the second output terminal region on the front surface of the protection device 244 against the reference plane 2432. Each rotating pin 2433B is provided with a rotation shaft 2436, which connects to the mold 2430 in a manner allowing rotation, and a pressure pin 2437, which is attached to the rotation shaft 2436 in a manner extending outward from the center of the rotation shaft 2436. In addition, each rotating pin 2433B has an activation arm 2438, which projects outside the mold 2430 and allows the rotating pin 2433B to be rotated from outside the mold 2430. Each activation arm 2438 has one end connected to the rotation shaft 2436 and the other end connected to a mechanism such as a cylinder 2439. Each rotation shaft 2436 can rotate, but it is joined to the mold 2430 in a manner that creates no gap between the rotation shaft 2436 and the mold cavity 2431. This is because injected molten resin will enter gaps and create burrs if gaps are created between rotation shafts 2436 and the inner walls of the mold cavity 2431. These rotating pins 2433B are rotated by cylinders 2439 to press against the back surface of the protection device holder 2411 via the pressure pins 2437. These rotating pins 2433B rotate to move pressure pins 2437 out of the way towards the inside walls of the mold cavity 2431 to avoid interference when the battery pack core is set in the mold cavity 2431. After the battery pack core is set in the mold cavity 2431, cylinders 2439 rotate the rotating pins 2433B, the back surface of the protection device holder 2411 is pressed against by the pressure pins 2437, and the front surface of the holder 2411 is pressed against the reference plane 2432 to retain the protection device 244 in a fixed position.

Figure 25:
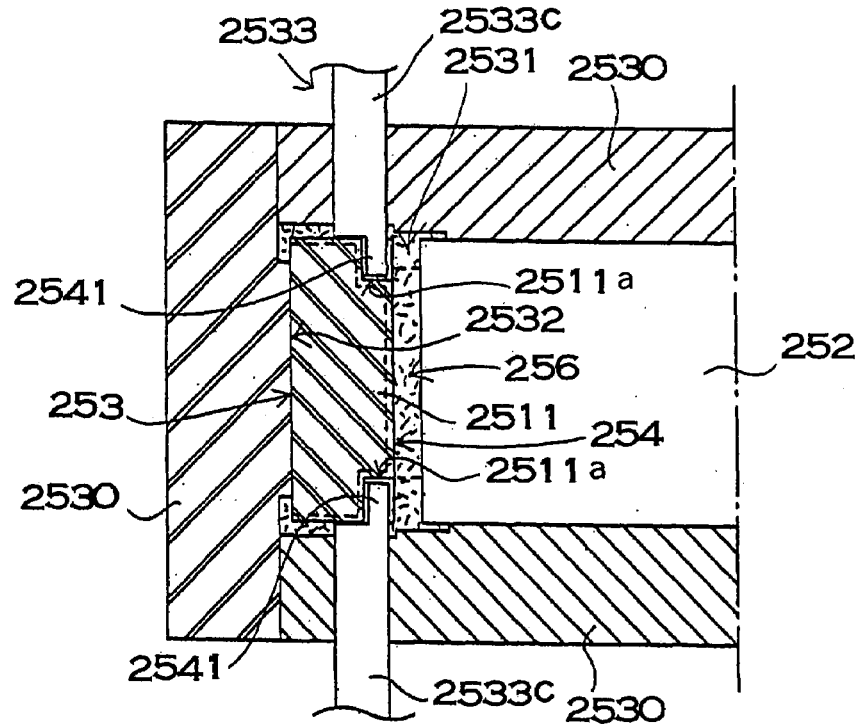
FIG. 25 is a cross-sectional view showing another embodiment of a mold for forming the molded resin region.
Figure 26:
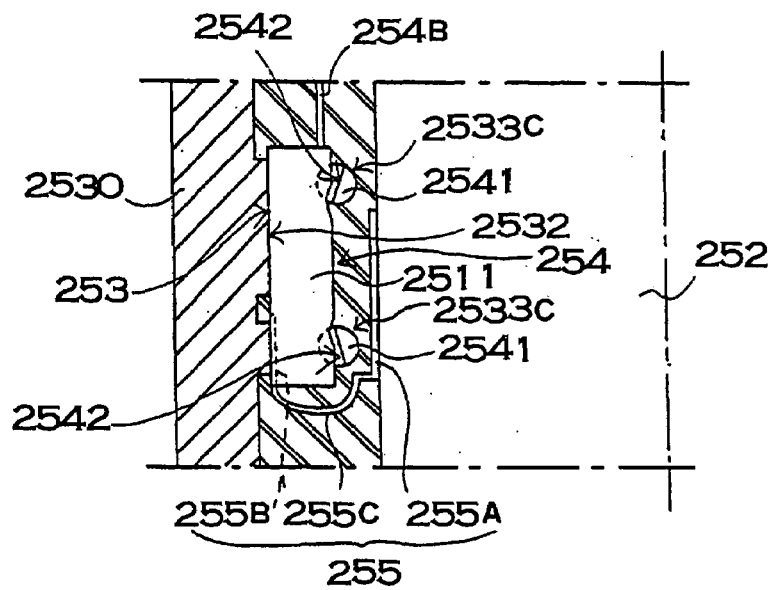
FIG. 26 is a horizontal cross-sectional view of the mold shown in FIG. 25.

The movable pins 2533 of FIGS. 25 and 26 are cam pins 2533C, which have cam surfaces 2542 at their tips that press against the back surface of the protection device holder 2511. These cam pins 2533C extend into the mold cavity 2531, and while extending into the mold cavity 2531, rotate around a center axis to press the front surface of the protection device holder 2511 against the reference plane 2532 via the cam surfaces 2542. The cam pins 2533C of the figures have cut-outs in the axial direction at their tips to form insertion projections 2541, which insert in the back surface of the protection device holder 2511, and the surfaces of these insertion projections 2541 opposite the protection device 254 are the cam surfaces 2542. The cam surfaces 2542 have shapes that allow the front surface of the protection device holder 2511 to be pressed against the reference plane 2532 when the cam pins 2533C are rotated around their central axes. The insertion projections 2541 shown in FIG. 25 have half circular cross-sections with cam surfaces 2542 as surfaces. However, insertion projections 2541 do not necessarily have to be half circular, and can be any shape that allows the protection device holder 2511 to be pressed against the reference plane 2532 via cam surfaces 2542 when the insertion projections 2541 are inserted into the back surface of the protection device holder 2511 and rotated. For example, the insertion projections can have curved surfaces as cam surfaces allowing smooth pressure application to the back surface of the protection device.

As shown in FIG. 25, movable pins 2533 which are cam pins 2533C extend into the mold cavity 2531 in a direction parallel to both surfaces of the protection device holder 2511, and the insertion projections 2541 insert in the back surface of the protection device holder 2511. In addition, as shown in FIG. 26, the cam pins 2533C rotate about the center of their axes with the insertion projections 2541 positioned on the back surface of the protection device holder 2511 to press the cam surfaces 2542 against the back surface of the protection device holder 2511. When the back surface of the holder 2511 is pressed, the first output terminal 253 and the output terminal region 255B of the second output terminal 255 are pressed against the mold reference plane 2532 and retained temporarily in fixed positions. Cam pins 2533C of this configuration can press holders from thick to thin against the reference plane 2532 by rotating, the angle of rotation being different for thick and thin holders towards the reference plane 2532. Namely, the cam pins 2533C rotate a small amount to press a thick holder against the reference plane 2532 and a large amount to press a thin holder against the reference plane 2532. Consequently, the cam surfaces 2542 are shaped to allow holders from the thickest to the thinnest to be pressed against the reference plane 2532. Preferably a plurality of cam pins 2533C are provided to press from above and below against a plurality of locations on the back surface of the protection device holder 2511 via the cam surfaces 2542. The mold 2530 shown in FIGS. 25 and 26 is provided with two upper and two lower cam pins 2533C which press against the protection device holder 2511 at four locations. The plurality of cam pins 2533C rotate together to press the cam surfaces 2542 against the back surface of the protection device holder 2511 at the same time. Here, cam pins 2533C at both edges of the protection device 254, namely upper and lower cam pins 2533C in FIG. 26, rotate in mutually opposing directions. The holder 254 is pressed strongly in one direction at both edges to prevent side to side shifting. A protection device 254 pressed simultaneously in this fashion at a plurality of locations on the holder 2511 is pressed more reliably against the reference plane 2532 and retained in a fixed position. These cam pins 2533C also retract by the same mechanism previously described for translation pins 2233A, 2333A to avoid interfering when the battery pack core is being set in the mold cavity 2531.

Although not illustrated, an alignment holder may also be disposed in the battery pack core between the protection device holder and the battery. The alignment holder is formed from plastic which is harder than that of the molded resin region. For example, the alignment holder is formed in a shape that mates with the protection device holder and is disposed in a fixed position. Further, the alignment holder can be provided with an alignment coupling section, and the alignment holder can be insertion molded in the molded resin region exposing the alignment coupling section to the outside. Thus an alignment coupling section can be established in this type of battery pack via a hard plastic alignment holder. The battery pack can be attached to electrical equipment in proper alignment with the alignment coupling section as a rugged structure. For an alignment coupling section which is a cavity, a projection established on the electrical equipment is inserted in the cavity, and the battery pack can be attached in a fixed position and prescribed orientation. The alignment coupling section can also be a projection. Electrical equipment provided with a cavity is joined to an alignment coupling section which is a projection.

However, as shown in FIGS. 4 and 5, an insertion molded battery pack with no alignment coupling section allows an extremely simple structure. In this case, the protection device 4 of the battery pack core 10 is insertion molded in the molded resin region, and the protection device 4 becomes fixed in the proper position by the molded resin region.

The mold 30 which forms the molded resin region has a cavity 31, which temporarily holds the battery 2 and protection device 4 in proper positions. The battery pack core 10 is temporarily held in the mold cavity 31. The first output terminal 3 and output terminal region 5B of the second output terminal 5 are pressed against the reference plane 32 and retained in proper positions as movable pins 33 press against the protection device 4 of the battery pack core 10 temporarily held in the mold cavity 31. Molten resin is injected into the mold cavity 31 in this configuration, and the protection device 4 becomes fixed in the proper position.

The battery 2 is a rechargeable (secondary) battery such as a lithium ion battery, a nickel hydrogen battery, or a nickel cadmium battery. The battery 2 of the figures is a thin outline battery with curved surfaces at both sides of the external case 2A and four rounded corners. When a lithium ion battery is used as the thin outline battery, it is characterized by high charge capacity per overall battery pack volume. As shown in FIG. 6, the battery 2 is provided with a safety valve 8 on the planar region 2C of the safety valve opening surface 20, on which the protruding electrode terminal 2B is established. When internal battery 2 pressure exceeds a prescribed pressure, the safety valve 8 opens. The safety valve 8 of the figures has its opening region 9 closed off by a thin membrane valve, which breaks open when internal pressure exceeds the prescribed pressure. Although a safety valve 8 which is a thin membrane valve allows a simple structure, the insulating material 15 can deform due to the pressure of molded resin region 1 formation, resulting a broken thin membrane valve. In the battery pack of the present invention, the insulating material 15 is configured in a fashion making it difficult to deform, and damage to the thin membrane valve by pressure during formation is prevented. However, any mechanism in which the valve opens at a prescribed pressure can also be used as the safety valve for the battery pack of the present invention. For example, a safety valve in which a flexible member presses elastically against the valve material can be used as the safety valve. This type of safety valve can also open and fail to operate properly if insulating material deforms and enters in from the opening region. A properly operating safety valve opens when internal battery pressure exceeds the prescribed pressure; the internal gasses escape to the outside, and the rise in internal pressure stops.

The surfaces of the protection device 4 and battery 2 to which the molded resin region 1 attaches are provided with a primer layer to strengthen attachment of the molded resin region 1. The primer layer strengthens molded resin region 1 adhesion when the molded resin region 1 is formed. In particular, the primer layer strengthens attachment of the molded resin region 1 to the metal case at battery surfaces. The primer layer can also be applied to the protection device holder 11 to firmly attach the molded resin region 1 to the holder 11. The primer layer is applied to surfaces to which the molded resin region 1 is attached. In the battery pack of the figures, the molded resin region 1 attaches to the safety valve opening surface 20, and primer layer is provided on the safety valve opening surface 20. Further, since the molded resin region 1 also attaches to the protection device holder 11, a primer layer is provided on those surfaces as well. In the un-hardened state, primer is a liquid which can be sprayed, or applied with a brush. Alternatively, the battery pack core 10 can be dipped into liquid primer to apply the primer layer. The primer layer can be applied to required surfaces of the battery pack core 10 as a unit, or it can be applied to battery 2 and protection device holder 11 surfaces prior to battery pack core 10 assembly. Primer layer applied to the protection device holder 11 is applied to surfaces excluding electrical contacts such as output terminals. This is because the primer layer can be a cause of electrical contact resistance. Since the primer layer has sufficient effect as a thin layer, its thickness is approximately 1 um. However, the primer layer can also be made from 0.5 to 5 um thick. Since the primer layer can also protect battery surfaces as well as promote molded resin region 1 attachment strength, its thickness can be increased to improve its protective function.

Synthetic resin for forming the molded resin region 1 can be polyamide resin, and primer for the primer layer can be an epoxy based resin. Acidic amide bonds within the polyamide resin of the molded resin region 1 chemically bond in the primer layer with epoxy radicals of the primer. For this reason, the molded resin region 1 attaches more strongly with the primer layer. In place of epoxy resin or in addition to epoxy resin, primers such as denatured epoxy based resin, phenol based resin, denatured phenol based resin, polyvinyl butyl based resin, and polyvinyl formal based resin can be used to form the primer layer. A plurality of these types of primers can also be mixed and used. In addition to forming chemical bonds with the polyamide resin of the molded resin region 1, these types of primers also form hydrogen bonds and chemical bonds with metal surfaces to strongly attach the molded resin region 1 to battery surfaces.

The synthetic resin for forming the molded resin region 1 is polyamide resin. Epoxy resin can also be added to the polyamide resin. Compared with straight polyamide resin, the attachment strength of the polyamide resin can be made greater with epoxy resin additive. Since polyamide resin has a low softening temperature and low viscosity when molten compared to other plastic synthetic resins, it can be molded at low temperatures and pressures. Further, it has the characteristic that it can be quickly removed from a mold cavity. A molded resin region 1 formed at low temperatures and pressures has the characteristic that molding time can be short, and detrimental effects from heat and injection pressure during molding on components such as the protection device 4 can be minimized. However, the battery pack of the present invention does not limit the resin for formation of the molded resin region to polyamide resin. Resins other than polyamide resin, such as polyurethane resin, can also be used. Further, if heat resistance of components which are insertion molded into molded resin region, such as the protection device, can be improved, plastic synthetic resins such as polyethylene, acrylic, and polypropylene can be used.

Figure 27:
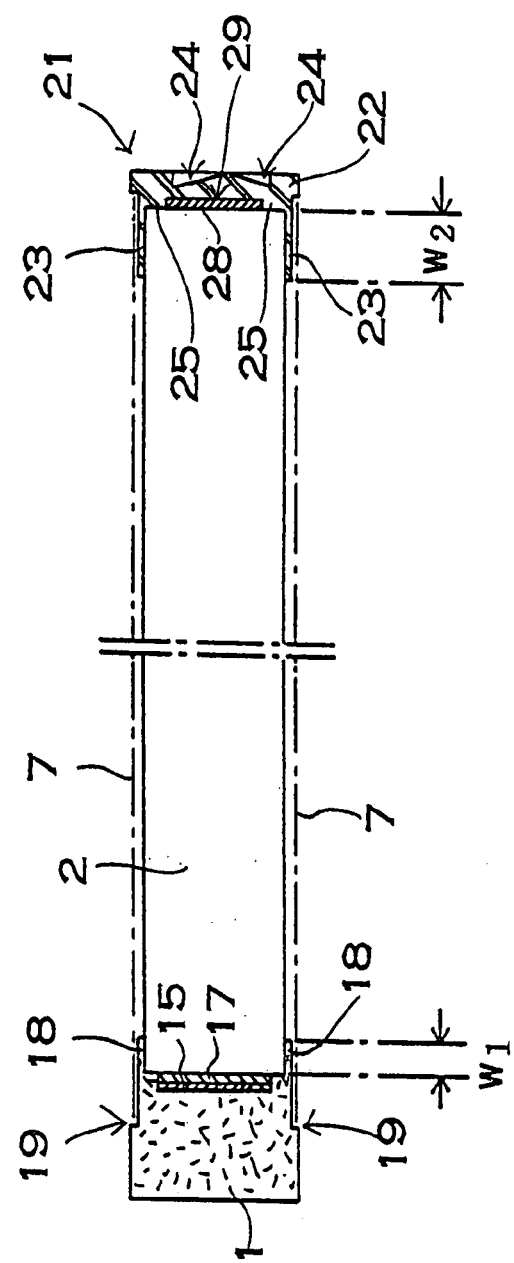
FIG. 27 is a vertical lengthwise cross-sectional view of the battery pack shown in FIG. 3.
Figure 28:
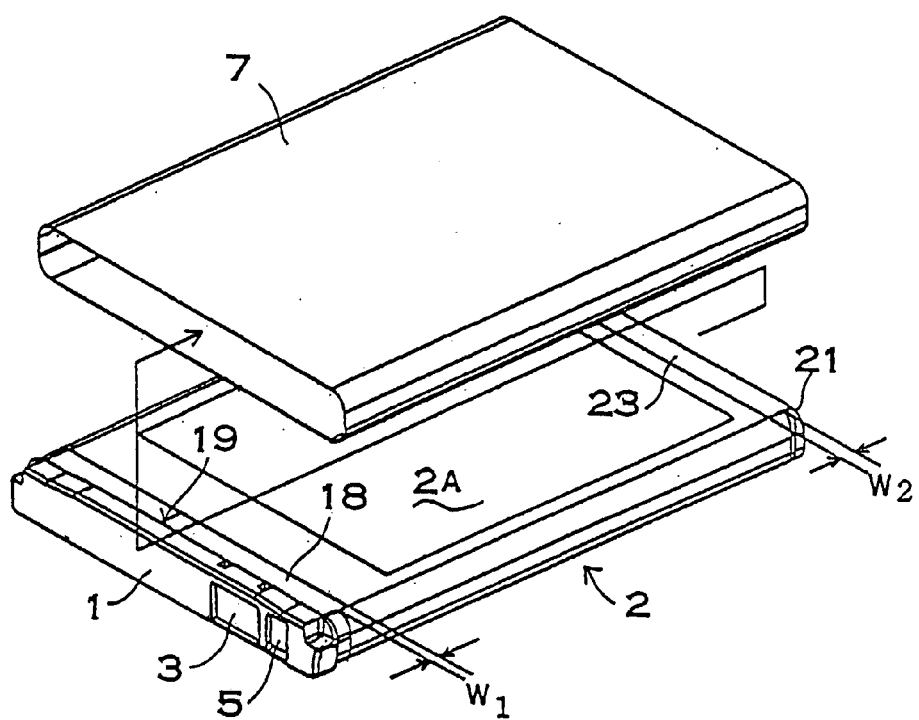
FIG. 28 is an exploded perspective view of an embodiment of a battery pack of the present invention.

As shown in FIGS. 3, 27, and 28, the battery pack of the figures has a region of thin wrap 18 which extends from the safety valve opening surface 20 to the surface of the battery periphery. This region of thin wrap 18 is molded as a unit with the molded resin region 1, and is attached to the external surface of the battery 2 during formation of the molded resin region 1. Molten resin is injected into the mold cavity 31 from the safety valve opening surface 20 to the region of thin wrap 18, and the region of thin wrap 18 is formed into a single unit with the molded resin region 1. Preferably, thin wrap 18 is wrapped entirely around the perimeter of the outer surface of the battery 2. However, thin wrap 18 may also be provided only on the wide surfaces of the outer perimeter of a thin outline battery.

If the region of thin wrap 18 is too thick, the battery outline becomes large, and if it is too thin, it does not have sufficient strength. Therefore, thickness of the thin wrap 18 is preferably 0.1 to 0.3 mm, and more preferably is 0.1 to 0.2 mm. This thickness of thin wrap 18 does not, in practice, significantly increase the overall thickness of a battery pack housing a thin outline battery. This is because the thin wrap 18 effectively absorbs thin outline battery expansion during use. A thin outline battery has the property that its central region expands somewhat as internal pressure increases. The thin wrap 18 thickness cited above is smaller than the amount of thin outline battery expansion. Further, the region of thin wrap 18 extends from the safety valve opening surface 20 to the surface of the battery periphery, and this region does not expand. Consequently, when the central region of the thin outline battery expands due to internal pressure, battery pack thickness at the region provided with thin wrap 18 is actually thinner than the expanded central region. Therefore, provision of thin wrap 18 results in a battery pack housing a thin outline battery, which does not expand from a practical view.

The width (W1) of the thin wrap 18 can be increased to increase the strength of attachment to the battery 2. Even with a quite narrow region of thin wrap 18, the molded resin region 1 can be firmly attached to the safety valve opening surface 20. In particular, for a battery pack covered with surface sheet 7 as shown in the figures, the region of thin wrap 18 can be pressed against the battery surface in a manner that will not de-laminate. Consequently, the width of the region of thin wrap 18 can be made as narrow as 0.1 to 2 mm, preferably 0.2 to 1 mm, for example 0.5 mm, and still firmly join the molded resin region 1 to the battery 2. A narrow region of thin wrap 18 allows reliable injection of molten synthetic resin and mold formation of the specified shape.

The surface sheet 7 is shrink tube, which can shrink with heat application. This surface sheet 7 tightly adheres to the surface of the thin wrap 18 region of the molded resin region 1 and strongly joins the molded resin region 1 to the battery 2. Further, a battery pack covered with surface sheet 7 can prevent ingress of a foreign substance, which could cause de-lamination between the thin wrap 18 and battery 2, thereby preventing thin wrap 18 de-lamination. However, the surface sheet 7 may also be a label or adhesive tape. Surface sheet 7 is attached to the surfaces of molded resin region 1 thin wrap 18, and to the battery surface, and firmly joins the molded resin region to the battery.

The battery pack shown in FIGS. 3 and 27 is provided with a step 19 on the periphery of the molded resin region 1, and the lower side of the step 19 is covered with surface sheet 7. Surface sheet 7 does not stick out from this molded resin region 1, and the molded resin region 1 and the surface of the surface sheet 7 can be made essentially as a single plane.

Further, in the battery pack shown in FIGS. 27 and 28, a formed plastic piece 21 made separately from the molded resin region 1 is attached to the end of the battery opposite the safety valve opening region and attached molded resin region, which is the bottom surface of the battery 2 in the figures. The surface of this formed plastic piece 21 can be made in a symmetric shape. Further, as shown in the oblique view of FIG. 6 and the cross-section view of FIG. 27 the formed plastic piece 21 is provided with alignment ribs 25, which locally contact the attachment surface at the end of the battery 2 and align the formed plastic piece 21. This type of formed plastic piece 21 can be attached to the battery 2 in proper orientation via adhesive bond 28. This is because a gap 29 is created by the alignment ribs 25 between the battery 2 end plane attachment surface and the formed plastic piece 21, and excess adhesive bond 28 is allowed to move into that gap 29.

Figure 29:
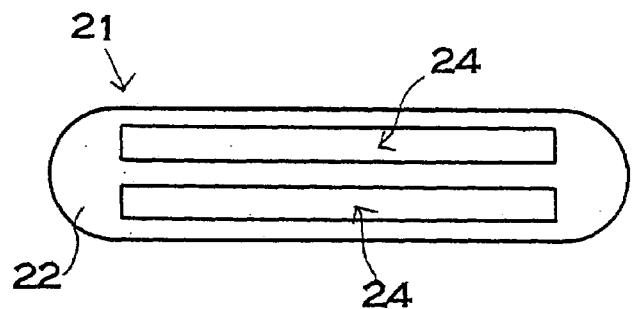
FIG. 29 is a bottom view of the formed plastic piece of the battery pack shown in FIG. 27.
Figure 30:
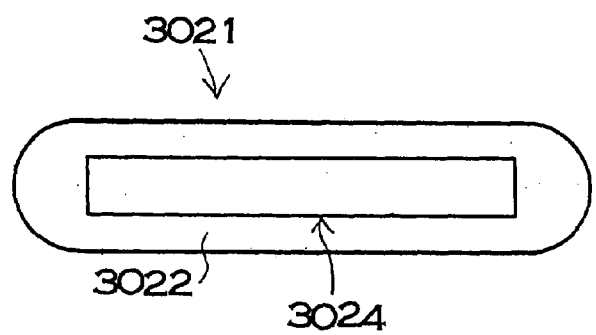
FIG. 30 is a bottom view of another embodiment of a formed plastic piece.

The formed plastic piece 21 is made of plastic which is harder than that of the molded resin region 1. This formed plastic piece 21 and a second region of thin wrap 23, which extends from the battery 2 end plane to the battery 2 external surface periphery, are formed as a single unit with a bottom section 22, which covers the entire battery 2 end plane region. The bottom section 22 is made thicker than the second region of thin wrap 23, and is provided with pull out grooves 24 for inserting the user's fingernails when disconnecting the battery pack from electrical equipment. The pull out grooves 24 are established on the surface of the bottom section 22 in symmetric shapes. As shown in the bottom view of FIG. 29, the formed plastic piece 21 shown in FIG. 27 is provided with two rows of vertically symmetric pull out grooves 24. Since a formed plastic piece 21 provided with symmetrically shaped pull out grooves 24 can be attached to the battery 2 without a specific orientation, battery pack fabrication can be efficiently performed without inviting processing errors. However, as shown in FIG. 30, the formed plastic piece 3021 may also be provided with a single pull out groove 3024 established at the center of the formed plastic piece 3021. In FIG. 30, 3021 is the formed plastic piece and 3022 is the bottom section.

The battery pack described above is manufactured as follows.

(1) As shown in FIG. 6, the second output terminal attachment region 5A is fixed to the battery planar region 2C electrode by a method such as spot welding. Next, as shown by the arrow in FIG. 6, the second output terminal is bent to put the protection device 4 in close proximity with the battery 2.

(2) The lead 4B, which is connected to the protection device 4, is fixed to the surface of the battery 2 protruding electrode terminal 2B by a method such as spot welding to connect the protection device 4 and the battery 2 producing the battery pack core 10. An alignment holder is disposed between the protection device and battery for a battery pack core with an alignment holder. A formed plastic piece 21 is bonded to the bottom of the battery 2 for a battery pack core 10 with a formed plastic piece 21 attached.

(3) As shown in FIG. 4, the battery pack core 10 is set in the mold cavity 31. At this time, movable pins 33 press against the protection device holder 11 and press the first output terminal 3 and the output terminal region 5B of the second output terminal 5 on the front surface of the protection device 4 against the reference plane 32. The protection device 4, which is pressed against the mold reference plane via movable pins 33, is retained in proper position for molding within the mold cavity 31. The mold 30 is closed after setting the battery pack core 10 in the mold cavity 31. The mold cavity 31 for forming the molded resin region is established inside the closed mold 30.

(4) Heated molten resin begins to be injected into the mold cavity 31, molten resin fills the mold cavity 31, and the molded resin region 1 is formed. Molten resin is injected into the mold cavity 31 via injection holes in the mold 30. Injected molten resin fills up to the region of thin wrap 18, and the molded resin region 1 forms a single unit structure with the region of thin wrap 18. During the molten resin injection process step, the movable pins 33 can press the protection device 4 against the reference plane 32 from the beginning to the end of molten resin injection. However, the movable pins 33 can also press the protection device 4 against the reference plane 32 at the beginning of molten resin injection and be retracted prior to completion of molten resin injection. When molten resin injection begins and molten resin is injected into the mold cavity 31, the protection device 4 is held in a fixed position by the injected molten resin. Consequently, after that point in the injection process, the movable pins 33 can be retracted from pressing the protection device holder 11 against the reference plane 32, and molten resin injection can be completed while movement out of position of the protection device 4 or second output terminal 5 is prevented. Since the movable pins 33 are not in position to press against the protection device holder 11 at the end of the injection process in this method, depressions in the molded resin region 1 caused by the movable pins 33 can be avoided.

(5) After the molded resin region 1 has hardened, the mold 30 is opened and battery pack is obtained with part of the battery pack core 10 inserted in the molded resin region 1.

(6) Finally, as shown in FIG. 28, the battery pack is inserted into cylindrically shaped surface sheet 7, which is shrink tube, and the shrink tube is heated to adhere tightly to the surface of the battery pack. The surface sheet 7 fits precisely and adheres tightly within the steps 19 provided on the molded resin region 1 and formed plastic piece 21, and firmly joins the molded resin region 1 and formed plastic piece 21.

Figure 31:
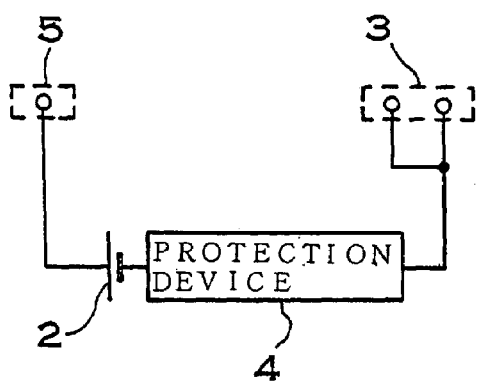
FIG. 31 is a circuit diagram of an embodiment of a battery pack of the present invention.

In the battery pack manufactured as described above and shown in FIG. 28, the first output terminal 3 is made larger than the second output terminal 5. Consequently, in addition to contacting the first output terminal 3 with the positive or negative terminal of the electrical equipment, a terminal to determine the type of battery pack can also be connected. Since this type battery pack has the circuit configuration shown in FIG. 31, electrical equipment to which this battery pack is attached can judge the battery pack as the proper type by measuring 0 Ohms of resistance between the power terminal and the terminal to determine the type of battery pack.

As this invention may be embodied in several forms without departing from the spirit or essential characteristics thereof, the present embodiment is illustrative and not restrictive, since the scope of the invention is defined by the claims rather than by the description preceding them, and all changes that fall within the metes and bounds of the claims or equivalence of such metes and bounds thereof are therefore intended to be embraced by the claims.

What is claimed is:

1. A battery pack comprising:
a battery having a safety valve opening surface;
a safety valve opening formed in said safety valve opening surface;
a safety valve disposed in said safety valve opening;
a molded resin region attached to said battery safety valve opening surface; and
an insulating material disposed between said safety valve opening surface and said molded resin region so as to cover said safety valve opening,
wherein said insulating material includes a through hole located at a position that is separate from said safety valve opening, and said molded resin region is connected to said battery safety valve opening surface through said through hole.

2. A battery pack as claimed in claim 1, wherein said insulating material comprises a rigid plate.

3. A battery pack as claimed in claim 1, wherein said insulating material is a glass fiber reinforced epoxy plate.

4. A battery pack as claimed in claim 1, wherein said insulating material is attached to said battery safety valve opening surface via double-sided adhesive tape.

5. A battery pack as claimed in claim 1, wherein said insulating material is disposed within the perimeter of said battery safety valve opening surface, and said molded resin region is attached to said safety valve opening surface about the perimeter of said insulating material.

6. A battery pack as claimed in claim 1, wherein said battery safety valve opening surface has a protruding electrode terminal, and said through hole in said insulating material is located between said protruding electrode terminal and said safety valve opening.

7. A battery pack as claimed in claim 1, wherein a formed plastic piece is attached to a surface of said battery opposite said safety valve opening surface, and one or more grooves are provided on a surface of said formed plastic piece.

8. A battery pack as claimed in claim 7, wherein said surface of said formed plastic piece has a symmetric shape.

9. A battery pack as claimed in claim 7, wherein said formed plastic piece has one or more alignment ribs which contact said battery and align said formed plastic piece in a fixed position.

10. A battery pack comprising:
a battery having a safety valve opening surface;
a safety valve opening formed in said safety valve opening surface;
a safety valve disposed in said safety valve opening;
a molded resin region secured to said battery safety valve opening surface; and
an insulating material disposed between said safety valve opening surface and said molded resin region so as to cover said safety valve opening,
wherein said insulating material includes a projection extending into said molded resin region, and said projection couples said insulating material and said molded resin region.

11. A battery pack as claimed in claim 10, wherein said projection has a reverse-tapered shape which becomes wider towards an end, a hook shape, a rod shape with a plurality of projections provided on a surface, or a rod shape provided with cavities or through-holes.

12. A battery pack as claimed in claim 10, wherein said insulating material has a through hole located at a position separated from said safety valve opening, and said molded resin region extends through said through hole to said battery safety valve opening surface.

13. A battery pack as claimed in claim 12, wherein said battery safety valve opening surface has a protruding electrode terminal and said through hole in said insulating material is located between said protruding electrode terminal and said safety valve opening.

14. A battery pack as claimed in claim 10, wherein said insulating material is a rigid plate that does not deform under a pressure exerted by an injection molding of said resin on said battery safety valve opening surface.

15. A battery pack as claimed in claim 14, wherein said insulating material is a glass fiber reinforced epoxy plate.

16. A battery pack as claimed in claim 10, wherein said insulating material is attached to said battery safety valve opening surface via double-sided adhesive tape.

17. A battery pack as claimed in claim 10, wherein said insulating material has a perimeter, which is superposed on said battery safety valve opening surface, and said molded resin region is attached to said safety valve opening surface about the perimeter of said insulating material.

18. A battery pack as claimed in claim 10, wherein a formed plastic piece is attached to a surface of said battery opposite to said safety valve opening surface, and one or more pull-out grooves are provided on a surface of said formed plastic piece.

19. A battery pack as claimed in claim 18, wherein said surface of said formed plastic piece has a symmetric shape.

20. A battery pack as claimed in claim 18, wherein said formed plastic piece has one or more alignment ribs that contact said battery to align said formed plastic piece in a fixed position.

* * * * *